(12) United States Patent
Koguchi et al.

(10) Patent No.: US 7,528,842 B2
(45) Date of Patent: May 5, 2009

(54) IMAGE PROCESSING APPARATUS AND IMAGE PROCESSING METHOD

(75) Inventors: Takahiro Koguchi, Tokyo (JP); Tetsugo Inada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 276 days.

(21) Appl. No.: 11/071,538

(22) Filed: Mar. 3, 2005

(65) Prior Publication Data

US 2005/0237335 A1 Oct. 27, 2005

(30) Foreign Application Priority Data

Apr. 23, 2004 (JP) .............................. 2004-127705

(51) Int. Cl.
*G06T 15/00* (2006.01)
(52) U.S. Cl. .................... 345/582; 345/419; 345/427; 345/506
(58) Field of Classification Search ................. 345/582, 345/506, 419, 427
See application file for complete search history.

(56) References Cited

U.S. PATENT DOCUMENTS

| | | | |
|---|---|---|---|
| 5,774,125 A * | 6/1998 | Suzuoki et al. ............. | 345/582 |
| 6,043,821 A | 3/2000 | Sprague et al. ............. | 345/430 |
| 6,191,793 B1 | 2/2001 | Piazza et al. ................ | 345/430 |
| 6,333,743 B1 | 12/2001 | Gossett et al. .............. | 345/503 |
| 6,373,495 B1 | 4/2002 | Lin et al. .................... | 345/582 |
| 6,417,854 B1 | 7/2002 | Isowaki et al. .............. | 345/473 |
| 6,456,291 B1 | 9/2002 | Fowler ....................... | 345/582 |
| 6,473,529 B1 | 10/2002 | Lin ............................. | 382/236 |
| 6,538,658 B1 * | 3/2003 | Herrera ...................... | 345/582 |
| 7,158,141 B2 * | 1/2007 | Chung et al. ................ | 345/506 |

FOREIGN PATENT DOCUMENTS

| | | |
|---|---|---|
| JP | 8-329257 | 12/1993 |
| JP | 8-161509 | 6/1996 |
| TW | 378312 | 1/2000 |
| TW | 419637 | 1/2001 |
| TW | 5004660 | 1/2001 |

OTHER PUBLICATIONS

International Search Report and Written Opinion dated Oct. 10, 2005 for corresponding International Application PCT/JP2005/008001.

Henry Styles et al. Customising Graphics Applications: Techniques and Programming Interface. Field-Programmable Custom Computing Machines, 2000 IEEE Symposium on NAPA Valley, Apr. 17, 2000, pp. 77-87, XP010531927.

(Continued)

*Primary Examiner*—Phu K Nguyen
(74) *Attorney, Agent, or Firm*—Katten Muchin Rosenman LLP

(57) ABSTRACT

A frame difference computation unit of a texture unit identifies a prediction macroblock, by evaluating sums of absolute differences between a target macroblock in a first frame image and a candidate for prediction macroblock in a second frame image, and determines a motion vector. The frame difference computation unit supplies information on motion vector for the macroblocks and image difference data to a shader unit, in addition to a frame image that serves as a reference for motion compensation. A frame encoding processing unit performs interframe compression encoding using data from the texture data, so as to generate encoded image data.

14 Claims, 18 Drawing Sheets

OTHER PUBLICATIONS

Notification of Reason(s) for Refusal dated Mar. 27, 2007, from the corresponding Japanese Application.

International Search Report and Written Opinion dated Sep. 11, 2007, for corresponding International Application PCT/JP2005/000801.

Henry Styles et al., "Customising Graphics Applications: Techniques and Programming Interface." Field-Programmable Custom Computing Machines, 2000 IEEE Symposium in NAPA Valley, Apr. 17, 2000, pp. 77-87, XP010531927.

Notice of Rejection dated Aug. 28, 2007 for corresponding Taiwanese Application No. 094112158.

* cited by examiner

IMAGE PROCESSING APPARATUS AND IMAGE PROCESSING METHOD

BACKGROUND OF THE INVENTION

1. Field of the Invention

The present invention relates to an image processing apparatus and an image processing method which perform a computation process on image data.

2. Description of the Related Art

In three-dimensional computer graphics, the polygon model, in which three-dimensional objects are generally represented by a larger number of polygons, is employed. In rendering objects using the polygon model, shading is performed in which the surface of polygons are shaded in consideration of light sources, view points and the reflectivity of objects' surfaces. In order to generate a photorealistic image, texture mapping, in which a texture image is mapped to the surface of polygon model, is performed.

By incorporating the image processing technology in computer graphics, reality and presence are enhanced. Images of natural scenery picked up by a camera may be used as texture data, or moving images picked up by a video camera may be blended into computer graphics. Motion picture experts group (MPEG) is known as a standard technology in moving image compression. In MPEG-4, texture coding that uses wavelet transform characterized by flexible spatial resolution scalability is employed for application to computer graphics.

In order to process moving images in computer graphics, a rendering engine should have the functions for moving image coding and decoding. A rendering engine currently available is often designed to be programmable in order to adapt to a complex rendering algorithm. By programming a rendering engine, a variety of functions are embodied. In this background, providing a rendering engine with advanced image processing functions such as moving image coding and decoding has become envisaged.

SUMMARY OF THE INVENTION

The present invention has been done in view of the aforementioned problems and its object is to provide an image processing apparatus and an image processing method capable of efficiently performing computation of image data.

An image processing apparatus according to one mode of practicing the invention meets the aforementioned challenge comprising: a storage unit which holds first and second texture data; and a computation unit which identifies areas of correspondence between the first texture and the second texture, and applies a predetermined computation process on a texel inside the area of correspondence in the first texture and a texel inside the area of correspondence in the second texture.

The predetermined computation process may be a computation related to a difference between a value of a texel in the first texture and a value of a texel in a second texture, the pixel in the first texture and the pixel in the second texture corresponding to each other in the areas of correspondence. For example, the computation may determine an absolute difference. The computation for absolute difference and the like may be performed by diverting an interpolation unit for linear interpolation of values of texels in at least one texture.

Another mode of practicing the present invention is also an image processing apparatus. The image processing apparatus according to this aspect comprises: a storage unit which holds first and second texture data; and a computation unit which switchably refers to the first texture and the second texture held in the storage unit, and alternately applies a predetermined computation process on a texel in the first texture and a texel in the second texture.

The image processing apparatus may further comprise a group of registers which concurrently hold first information set up for the first texture and second information set up for the second texture. The computation unit may read the first and second texture data, in accordance with the first and second information, respectively, held in the group of registers, and applies the predetermined computation process on the data. With this, it is not necessary to switch contexts for referring to two textures.

The predetermined computation process may be a comparison in magnitude between a value related to a texel in a predetermined area in the first texture and a value related to a texel in a predetermined area in the second texture. For example, the computation may determine a minimum value or a maximum value.

Still another mode of practicing the present invention is an image processing apparatus. The image processing apparatus according to this aspect comprises: a texture unit which applies a computation process on texture data; and a shading unit connected to the texture unit via a bus, which generates rendering data, based on the texture data subjected to the computation process by the texture unit. The texture unit reads frame images of a moving image as the texture data, computes a difference related to frame images, and outputs results of difference computation to the shading unit, and the shading unit applies compression encoding on the moving image using the results of difference computation related to the frame images received from the texture unit.

The difference computation related to frame images may be a computation for a difference between different pixels within a frame or a computation for a difference between corresponding pixels in two frames.

The texture unit may read two frame images as the texture data, compute a difference between the two frame images, and output results of difference computation to the shading unit, and the shading unit may apply compression encoding to the moving image using the difference between the two frame images received from the texture unit.

Another mode of practicing the present invention is an image processing method. An image processing method according to the invention comprises: reading out data for first and second textures from a memory; identifying areas of correspondence between the first texture and the second texture; and applying a predetermined computation process on a texel inside the area of correspondence in the first texture and a texel inside the area of correspondence in the second texture.

Yet another mode of practicing the present invention is an image processing method. An image processing method according to this aspect comprises: switchably referring to a first texture and a second texture held in a memory; and alternately applying a predetermined computation process on a texel in the first texture and a texel in the second texture.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

FIGS. 6A and 6B illustrate first texture data and second texture data that the computation unit of FIG. 5 refers to.

DESCRIPTION OF THE PREFERRED EMBODIMENTS

The invention will now be described by reference to the preferred embodiments. This does not intend to limit the scope of the present invention, but to exemplify the invention.

Figure 1:
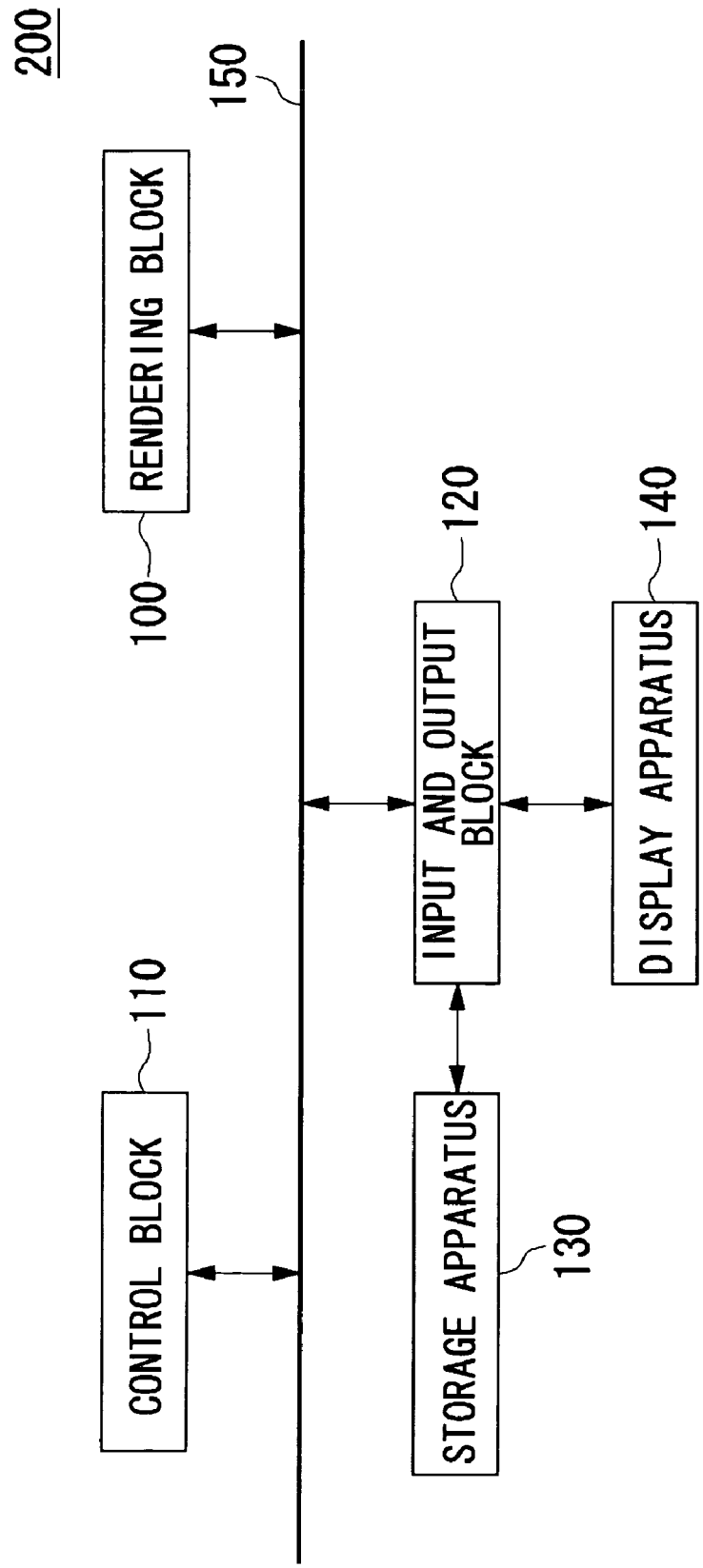
FIG. 1 shows a structure of an image generation apparatus according to an embodiment of the present invention.

FIG. 1 shows a structure of an image generation apparatus 200 according to an embodiment of the present invention. The image generation apparatus 200 is comprised of a rendering block 100, a control block 110 and an input and output block 120 connected to each other via a bus 150. A storage apparatus 130 and a display apparatus 140 are connected to the input and output block 120. The input and output block 120 may communicate with other apparatuses via a network so as to import data necessary for rendering from an external source.

The control block 110 is a block that controls the entirety of the image generation apparatus 200. The control block 100 manages synchronization of data transfer between the interior of the image generation apparatus 200 and peripheral apparatuses such as the storage apparatus 130 and the display apparatus 140. The control block 110 is also responsible for management of interrupts from the individual units in the image generation apparatus 200, and management of a timer.

The input and output block 120 reads three-dimensional model information and various parameters stored in the storage apparatus 130 and provides the read data to the rendering block 100. The input and output block 120 may receive data necessary for rendering from an external apparatus via the network so as to provide the received data to the rendering block 100. The input and output block 120 displays rendering data output by the rendering block 100 to the display apparatus 140.

The rendering block 100 performs a rendering process by generating rendering data by referring to the three-dimensional model information supplied from the input and output block 120 and writing the generated data in a frame buffer.

Figure 2:
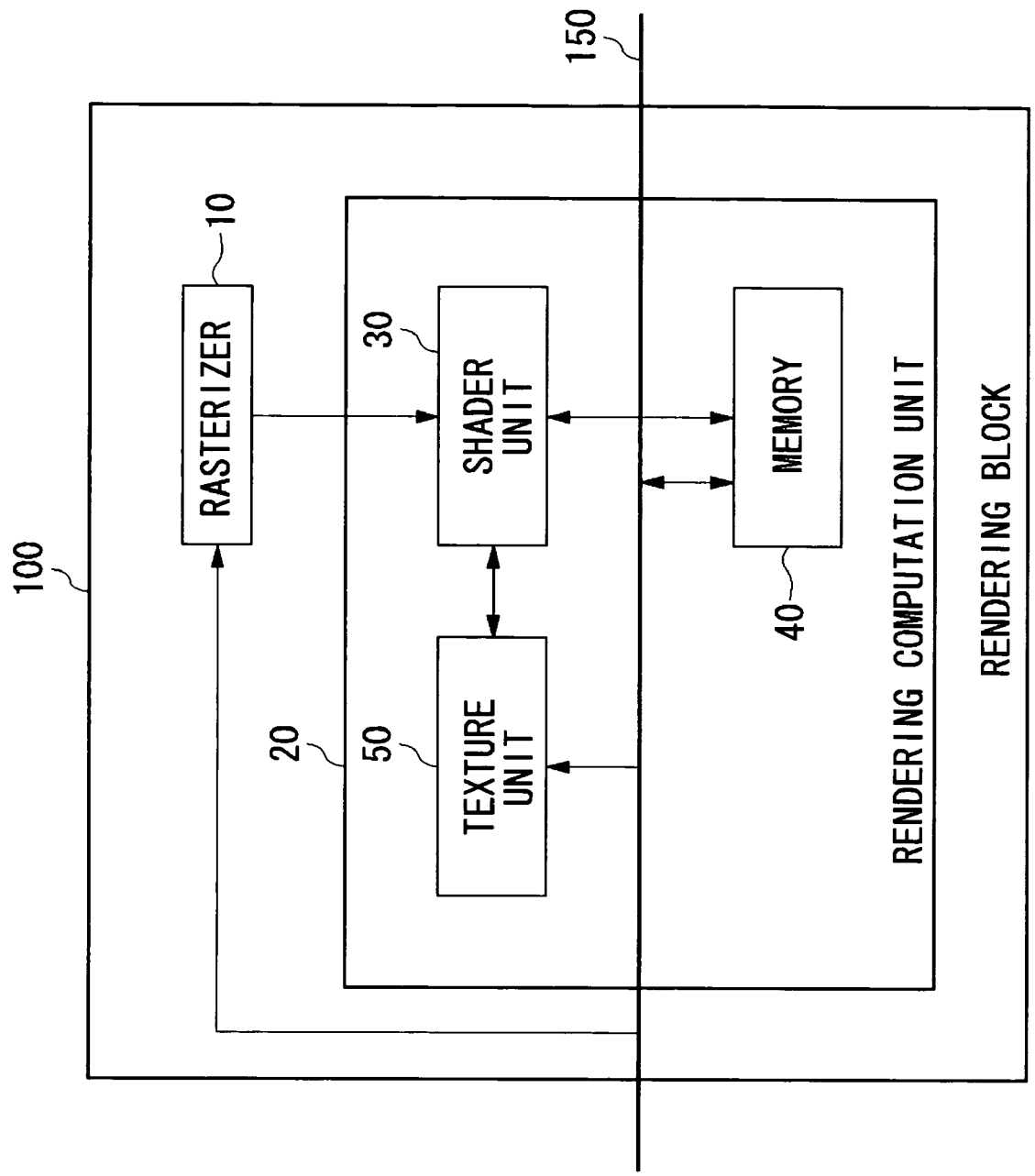
FIG. 2 shows a structure of a rendering block of FIG. 1.

FIG. 2 shows a structure of the rendering block 100. A rasterizer 10 receives vertex data of rendering primitives from the input and output block 120. Generally, a rendering primitive is a triangle. The rasterizer 10 performs a view transform by projective transform of a triangle in the three-dimensional space into a triangle on a rendering plane. Further, the rasterizer 10 performs a rastering process by scanning the triangle on the rendering plane in the horizontal direction so as to transform, row by row, the triangle into quantized pixels. The rasterizer 10 develop the rendering primitive into pixels and computes pixel information including an RGB color value, an a value and a Z value for each pixel.

The rasterizer 10 generates a pixel area (hereinafter, referred to as a rendering target area) of a predetermined size along the scan line and supplies the generated area to a rendering computation unit 20 in the subsequent stage. The rendering computation unit 20 includes a shader unit 30, a memory 40 and a texture unit 50. The memory 40 is provided with a frame buffer and a texture buffer. The frame buffer and the texture buffer may be provided in a single memory or physically separated memories.

The rendering target area supplied from the rasterizer 10 to the rendering computation unit 20 is stacked in a queue. The shader unit 30 sequentially processes the rendering target areas stacked in the queue.

The shader unit 30 performs a shading process by referring to pixel information computed by the rasterizer 10, determines pixel colors after texture mapping by referring to texel information obtained by the texture unit 50, and writes rendering data in the frame buffer in the memory 40. The shader unit 30 further performs processes like fogging and alpha blending on the rendering data held in the frame buffer so as to determine rendering colors ultimately to be reproduced, and updates the rendering data in the frame buffer. The rendering data stored in the frame buffer are read by the input and output block 120 and-output to the display apparatus 140.

The texture unit 50 receives an input of parameters designating texture data from the shader unit 30, computes addresses of the texture data, and requests the texture buffer in the memory 40 to provide necessary texture data. The texture unit 50 caches the texture data read from the texture buffer, performs filtering processes such as bilinear interpolation and trilinear interpolation, and outputs resultant data to the shader unit 30.

Figure 3:
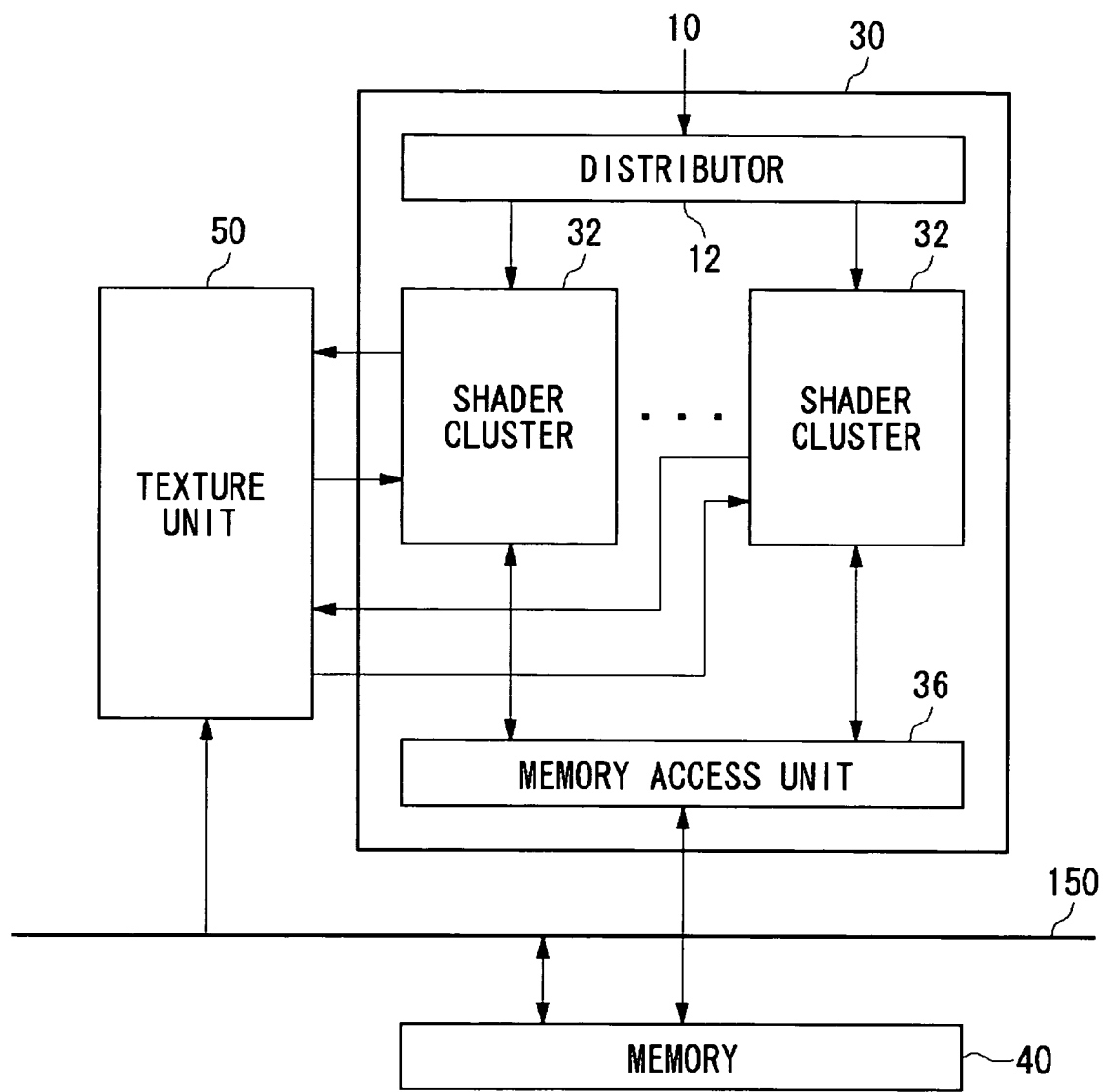
FIG. 3 shows a detailed structure of the rendering computation unit of FIG. 2.

FIG. 3 shows a detailed structure of the rendering computation unit 20. The shader unit 30 in the rendering computation unit 20 is provided with a plurality of shader clusters 32 in non-synchronous operation, the shader clusters executing pixel rendering processes in parallel, by processing pixel data respectively in their charge.

A distribution unit 12 determines the shader cluster 32 in charge of the rendering target area stacked in the queue, generates associated parameters, and supplies the rendering target area and the parameters to the shader cluster 32.

One texture unit 50 is provided in the rendering computation unit 20. Each of the shader clusters 32 feeds a texture load command that includes texture parameters for designating texture data to the texture unit 50 so as to receive the texture data subjected to texture mapping from the texture unit 50.

The shader cluster 32 performs shading such as flat shading and glow shading, determines color values of the rendered pixels, and writes the determined color values in the frame buffer in the memory 40. The shader cluster 32 blends the color values of texels mapped to the pixels with the color values of the pixels read from the frame buffer, in accordance with the texture data output from the texture unit 50. When the pixel colors, the texel colors, the alpha values and the fog values are determined, the shader cluster 32 writes the data of the pixels to be ultimately rendered in the frame buffer. The memory access unit 34 controls writing and reading of the pixel data to and from the frame buffer by the shader cluster 32.

Since the texture unit 50 performs processes including address computation of texture, memory access and filtering, upon receipt of the texture load command from the shader cluster 32, a comparatively long time is consumed before an output is obtained, as compared to the computation in the shader cluster 32. Accordingly, the shader cluster 32 processes a rendering target area other than the rendering target area being processed, after the texture load command is executed, so that the processing efficiency is improved.

Figure 4:
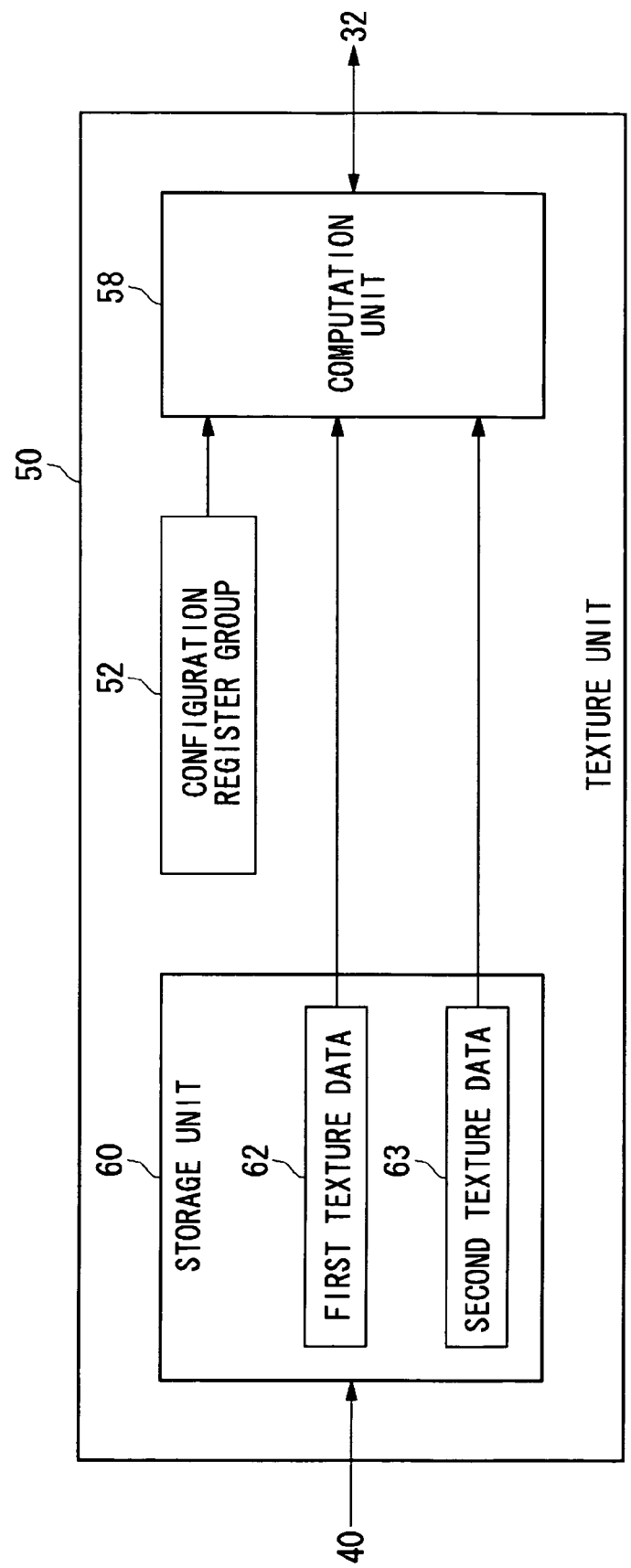
FIG. 4 shows a structure of a texture unit of FIG. 3.

FIG. 4 shows a structure of the texture unit 50. The texture unit 50 computes addresses in the texture buffer by converting texture coordinates into texel coordinates, reads texel information in accordance with the computed addresses, and determines color information of the texels mapped to the pixels by a filtering process such as bilinear filtering. A description will now be given of a structure of the texture unit 50.

A computation unit 58 accepts inputs of a texture load command, a parameter acquisition command from a plurality of shader clusters 32, processes the commands sequentially, and delivers results of the processes to the shader cluster 32.

A texture load command includes texture parameters designating texture data. The texture parameters include texture coordinates, texel coordinates and a level of detail (LOD) value.

A configuration register group 52 is a group of configuration registers that hold, as configuration information, information defining the operation of the texture unit 50. Since the configuration register group 52 holds the set values, it is not necessary to renew the setting when the same mode or condition continues to be used with the previous setting.

The configuration register group 52 includes registers respectively holding a base address, an operation mode, a parameter etc. to enable the use of texture. When two textures A and B are simultaneously referred to as mentioned later, the register set A, which holds the base address, the operation mode and the parameter of texture A, and the register set B, which holds the base address, the operation mode and the parameter of texture B, are used. Therefore, it is not necessary to switch between two sets of information, i.e. contexts, even when the two textures A and B are concurrently referred to or the two textures are switchably referred to. Thus, no overhead is produced as a result of context switching.

The computation unit 58 applies a filtering process such as bilinear interpolation to the texture data in accordance with the information set in the configuration register group 52.

A storage unit 60 stores first texture data 62 and second texture data 63. The storage unit 60 is used as a buffer for holding the first texture data 62 and the second texture data 63 read from the memory 40. The storage unit 60 provides the first texture data 62 and the second texture data 63 to the computation unit 58 in accordance with a request from the computation unit 58. Alternatively, the computation unit 58 may directly read the first texture data 62 and the second texture data 63 from the texture buffer in the memory 40, bypassing the storage unit 60.

Figure 5:
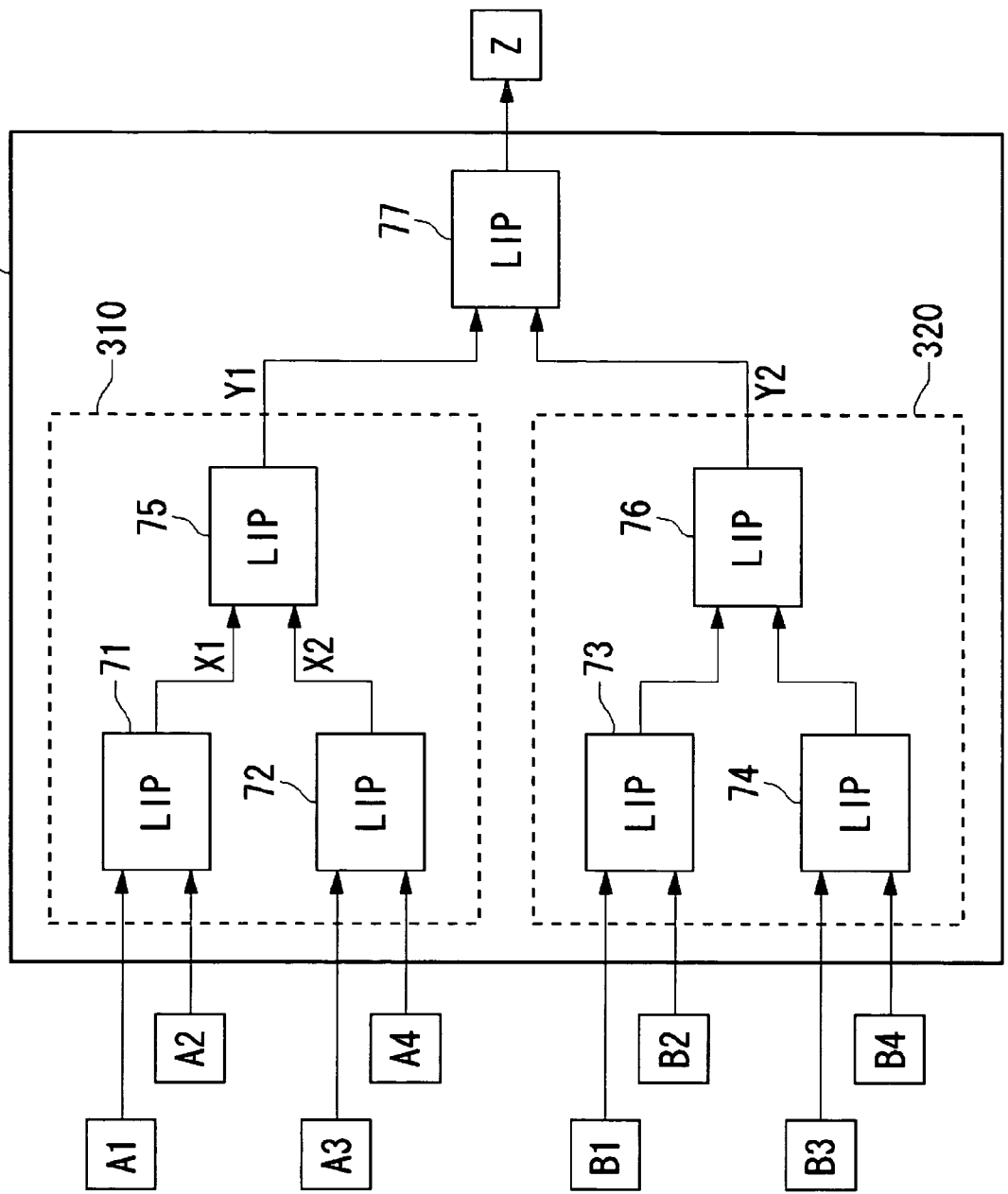
FIG. 5 shows a structure of a computation unit of FIG. 4.

FIG. 5 shows a structure of the computation unit 58. The computation unit 58 acquires the first texture data 62 and the second texture data 63, and performs a filtering process such as bilinear interpolation and trilinear interpolation. For the filtering process, the computation unit 58 is provided with three stages of interpolation units (hereinafter, referred to as LIP's) 71-77.

The computation unit 58 is provided with four LIP's 71-74 as first-stage interpolation units, two LIP's 75 and 76 as second-stage interpolation units, and one LIP 77 as a third-stage interpolation unit. For convenience of description, the interpolation units in the first and second stages are divided into LIP 71, LIP 72 and LIP 75 in the upper stage (hereinafter, these units will be generically referred to as an upper-row computation block 310), and LIP 73, LIP 74 and LIP 76 in the lower stage (hereinafter, these units will be generically referred to as a lower-row computation block 320). Results of computation by the upper-row computation block 310 and the lower-row computation block 320 are fed to the LIP 77 of the third stage.

In both the upper-row computation block 310 and the lower-row computation block 320, the interpolation unit in the first stage is responsible for linear interpolation in the u direction of the texel coordinate system (u, v), and the interpolation unit in the second stage is responsible for linear interpolation in the v direction in the texel coordinate system (u, v). Accordingly, as a result of two-stage filtering in the upper-row computation block 310 and the lower-row computation block 320, bilinear interpolation, in which linear interpolation is performed in the u and v directions is implemented through two-stage filtering, is achieved.

The LIP 77 in the third stage subjects the result of bilinear interpolation by the upper-row computation block 310 and the result of bilinear interpolation by the lower-row computation block 320 to additional linear interpolation. With this, trilinear interpolation is achieved. We take mipmap texture as an example. Each of the upper-row computation block 310 and the lower-row computation block 320 performs bilinear interpolation in mipmap textures with different resolution levels. The third-stage LIP 77 performs computations for interpolation between different resolution levels of mipmap textures, responsive to the result of bilinear interpolation by the upper-row computation block 310 and the lower-row computation block 320.

Figure 6A:
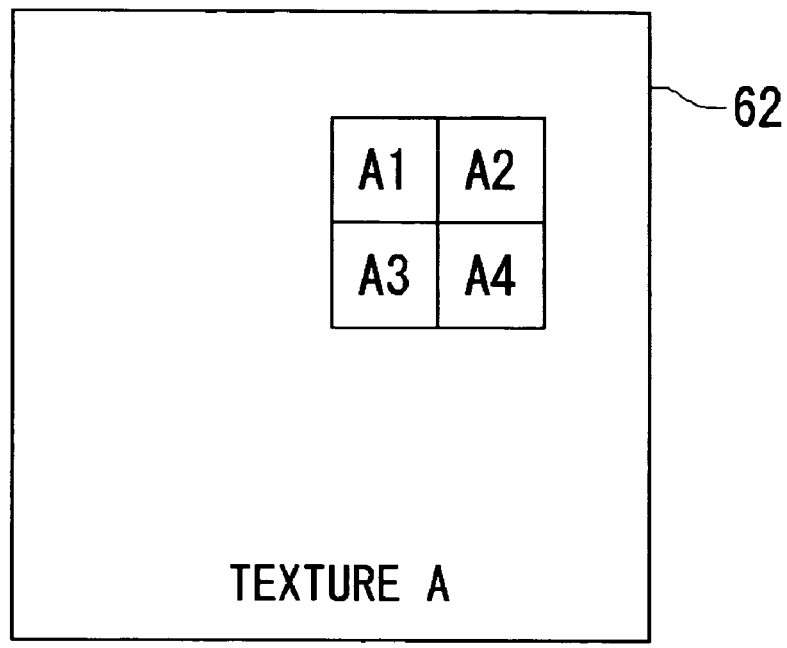
Figure 6B:
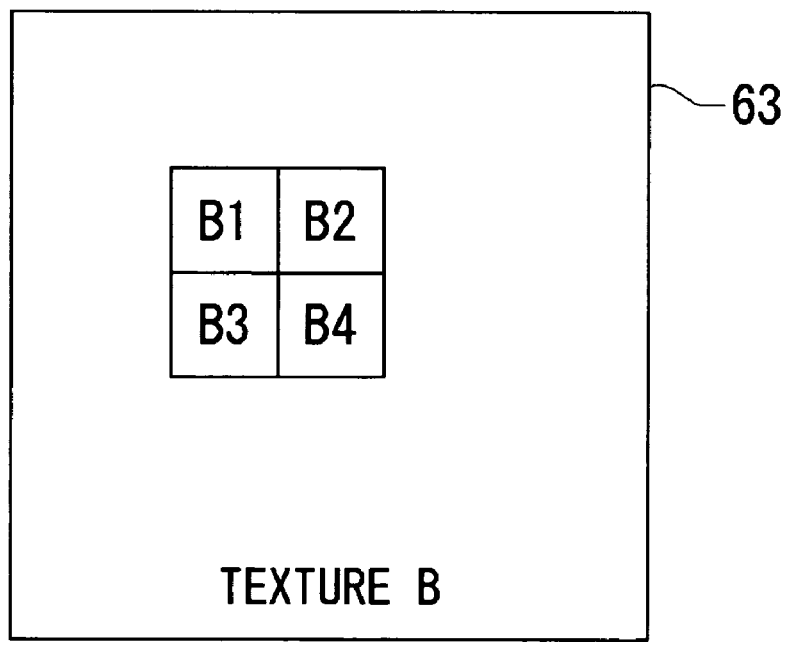

FIGS. 6A and 6B illustrate the first texture data 62 and the second texture data 63 that the computation unit 58 refers to. The first texture data 62 will be referred to as a texture A and the second texture data 63 will be referred to as a texture B. The computation unit 58 acquires four texels A1-A4 in the texture A shown in FIG. 6A and four texels B1-B4 in the texture B shown in FIG. 6B.

The upper-row computation block 310 subjects the four texels A1-A4 of the texture A to bilinear interpolation. The LIP 71 of the first stage is fed the upper-row two texels A1 and the texel A2, selected from the four texels in the texture A. The LIP 71 computes and outputs an interpolated value X1 obtained by interior division at a ratio of interior division of $\alpha:(1-\alpha)$ of the texels A1 and A2, using a linear interpolation formula $X1=(1-\alpha)A1+\alpha A2$. The interpolation coefficient $\alpha$ is a real number between 0 and 1.

Similarly, the LIP 72 of the first stage is fed the lower-row two texels A3 and A4, selected from the four texels in the texture A, and computes an interpolated value X2 using a linear interpolation formula $X2=(1-\alpha)A3+\alpha A4$. Thus, the LIP 71 and the LIP 72 of the first stage apply linear interpolation to the four texels in the upper and lower rows, in the u direction in the texel coordinate system (u, v).

The LIP 75 of the second stage is fed the computation results X1 and X2 from the LIP 71 and the LIP 72 of the first stage, respectively, and computes and outputs an interpolated value Y1 by subjecting the computation results X1 and X2 to interpolation using a linear interpolation formula $Y1=(1-\alpha)X1+\alpha X2$. This is a linear interpolation in the v direction in the texel coordinate system (u, v).

Thus, the first-stage LIP 71 and the LIP 72 of the upper-row computation block 310 subject the four texels A1-A4 of the texture A to linear interpolation in the u direction. The second-stage LIP 75 subjects the results to linear interpolation in the v direction. Consequently, a result of bilinear interpolation in the u and v directions is output.

Similarly, the lower-row computation block 320 subjects the four texels B1-B4 of the texture B to bilinear interpolation. Similarly, the LIP 73 of the first stage is fed the upper-row two texels B1 and B2, selected from the four texels in the texture B, and computes an interpolated value X3 using a linear interpolation formula $X3=(1-\alpha)B1+\alpha B2$. The LIP 74 of the first stage is fed the lower-row two texels B3 and B4, selected from the four texels in the texture B, and computes an interpolated value X4 using a linear interpolation formula $X4=(1-\alpha)B3+\alpha B4$. The LIP 76 of the second stage is fed the computation results X3 and X4 from the LIP 73 and the LIP 74 of the first stage, respectively, and computes and outputs an interpolated value Y2 by subjecting the computation results X3 and X4 to interpolation using a linear interpolation formula $Y2=(1-\alpha)X3+\alpha X4$.

Thus, the first-stage LIP 73 and the LIP 74 of the lower-row computation block 320 subject the four texels B1-B4 of the texture B to linear interpolation in the u direction. The second-stage LIP 76 subjects the results to linear interpolation in the v direction. Consequently, a result of bilinear interpolation in the u and v directions is output.

The LIP 77 of the third stage is fed the computation results Y1 and Y2 from the LIP 75 and the LIP 76 of the second stage, respectively, and computes and outputs an interpolated value Z by subjecting the computation results Y1 and y2 to interpolation using a linear interpolation formula $Z=(1-\alpha)Y1+\alpha Y2$.

Figure 7:
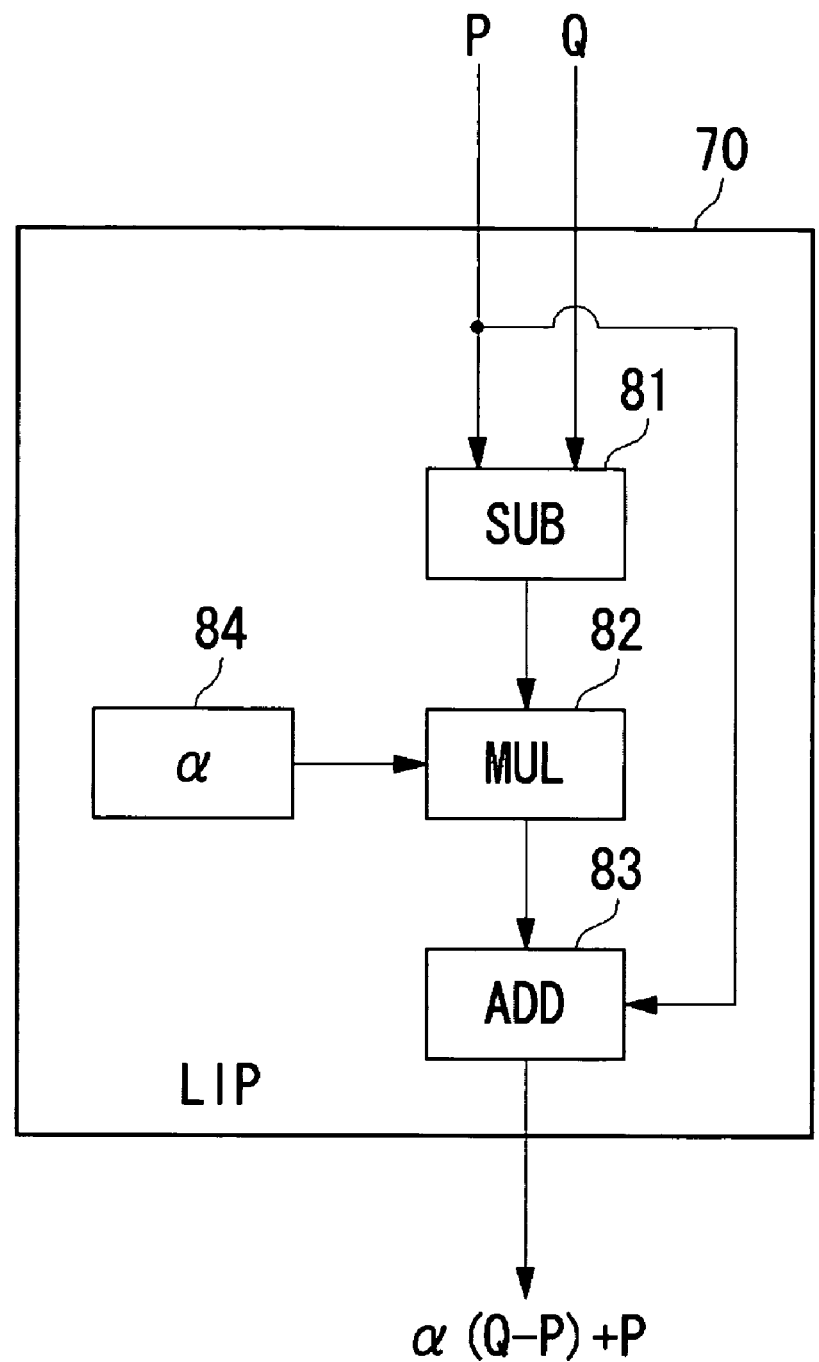
FIG. 7 shows a structure of an interpolation unit of FIG. 5.

The LIP 71-LIP 77 of FIG. 5 (generically referred to as LIP 70) have the identical function and structure. FIG. 7 shows a structure of the LIP 70. The LIP 70 includes a subtracter (SUB) 81, a multiplier (MUL) 82, an adder (ADD) 83 and a coefficient holding unit 84 holding the interpolation coefficient $\alpha$.

The LIP 70 is fed a first input value P and a second input value Q. The subtracter 81 computes a difference Q-P of the two input values P and Q, and supplies the result to the multiplier 82. The multiplier 82 is fed the input of the difference Q-P from the subtracter 81 and the input of the interpolation coefficient $\alpha$ from the coefficient holding unit 84, outputs $\alpha(Q-P)$, obtained by multiplying the difference Q-P by the interpolation coefficient $\alpha$, to the adder 83. The adder 83 is fed the input of the multiplication result $\alpha(Q-P)$ from the multiplier 82 and outputs $\alpha(Q-P)+P$, obtained by adding the input value P to the multiplication result.

The output of the LIP 70 can be transformed into $\alpha(Q-P)+P=(1-\alpha)P+\alpha Q$, a linear interpolation of the two inputs P and Q by a ratio of interior division $\alpha(1-\alpha)$.

Hereinafter, the function and structure of the LIP 70 including the subtracter 81, the multiplier 82 and the adder 83 are diverted to computation use other than linear interpolation, by slightly modifying the computation process. With this, the computation unit 58 is capable of useful computation other than bilinear interpolation and trilinear interpolation.

Figure 8:
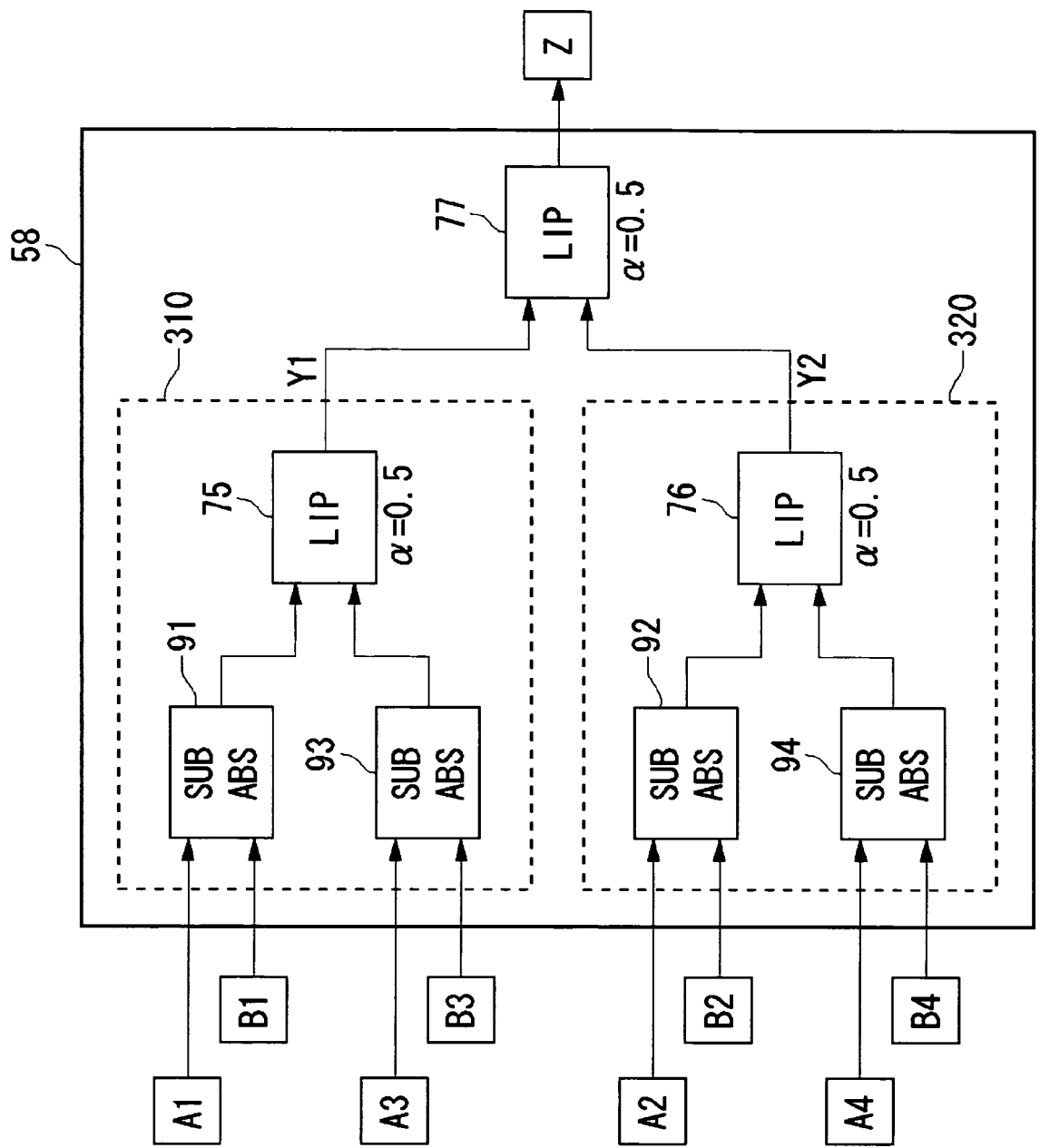
FIG. 8 shows a structure of the computation unit of FIG. 4 for computing a sum of absolute differences.

FIG. 8 shows a structure of the computation unit 58 for computing a sum of absolute differences. Absolute difference units (hereinafter, abbreviated as SUBABS) 91-94 (hereinafter, generically referred to as SUBABS 90) are a variation, in operation, of the LIP 70 of FIG. 7 and capable of computing an absolute difference of two input values.

The computation unit 58 is fed the four texels A1-A4 of the texture A and the four texels B1-B4 of the texture B. It is to be noted that the four texels A1-A4 of the texture A and the four texels B1-B4 of the texture B are fed to the SUBABS's 91-94 of the first stage in a way different from that of the basic structure of the computation unit 58 shown in FIG. 5.

The first-stage SUBABS 91 of the upper-row computation block 310 is fed a mutually corresponding texel pair (A1, B1) from the two textures A and B, and computes and outputs an absolute difference |A1-B1| between the two texels A1 and B1. The first-stage SUBABS 92 is fed a mutually corresponding texel pair (A3, B3) from the two textures A and B, and computes and outputs an absolute difference |A3-B3| between the two texels A3 and B3.

The second-stage LIP 75 is fed the computation result |A1-B1| of the first-stage SUBABS 91 and the computation result |A3-B3| of the SUBABS 93, and subjects the computation results to linear interpolation using the interpolation coefficient $\alpha=0.5$. Since the interpolation coefficient is such that $\alpha=0.5$, the second-stage LIP 75 computes an average of the two computation results, and outputs $Y1=(|A1-B1|+|A3-B3|)/2$.

Similarly, the first-stage SUBABS 92 of the lower-row computation block 320 is fed a mutually corresponding texel pair (A2, B2) from the two textures A and B, and computes and outputs an absolute difference |A2-B2| between the two texels A2 and B2. The first-stage SUBABS 94 is fed a mutually corresponding texel pair (A4, B4) from the two textures A and B, and computes and outputs an absolute difference |A4-B4| between the two texels A4 and B4.

The second-stage LIP 76 is fed the computation result |A2-B2| of the first-stage SUBABS 92 and the computation result |A4-B4| of the SUBABS 94, and similarly subjects the computation results to linear interpolation using the interpolation coefficient $\alpha=0.5$ so as to output an average value $Y2=(|A2-B2|+|A4-B4|)/B2$.

The third-stage LIP 77 is fed the computation results Y1 and Y2 of the LIP 75 and the LIP 76 of the second stage and subjects the computation results to linear interpolation using the interpolation coefficient $\alpha=0.5$. This results in the third-stage LIP 77 computing $Z=(Y1+Y2)/2=\Sigma_{i=1}^{4}|Ai-Bi|/4$. Accordingly, the ultimate output Z of the computation unit 58 gives a sum of absolute differences (SAD) of the mutually corresponding pairs (A1, B1)-(A4, B4) of the two textures A and B. The computation by the computation unit 58 for obtaining the sum of absolute differences will be referred to as 2*2SAD.

Figure 9:
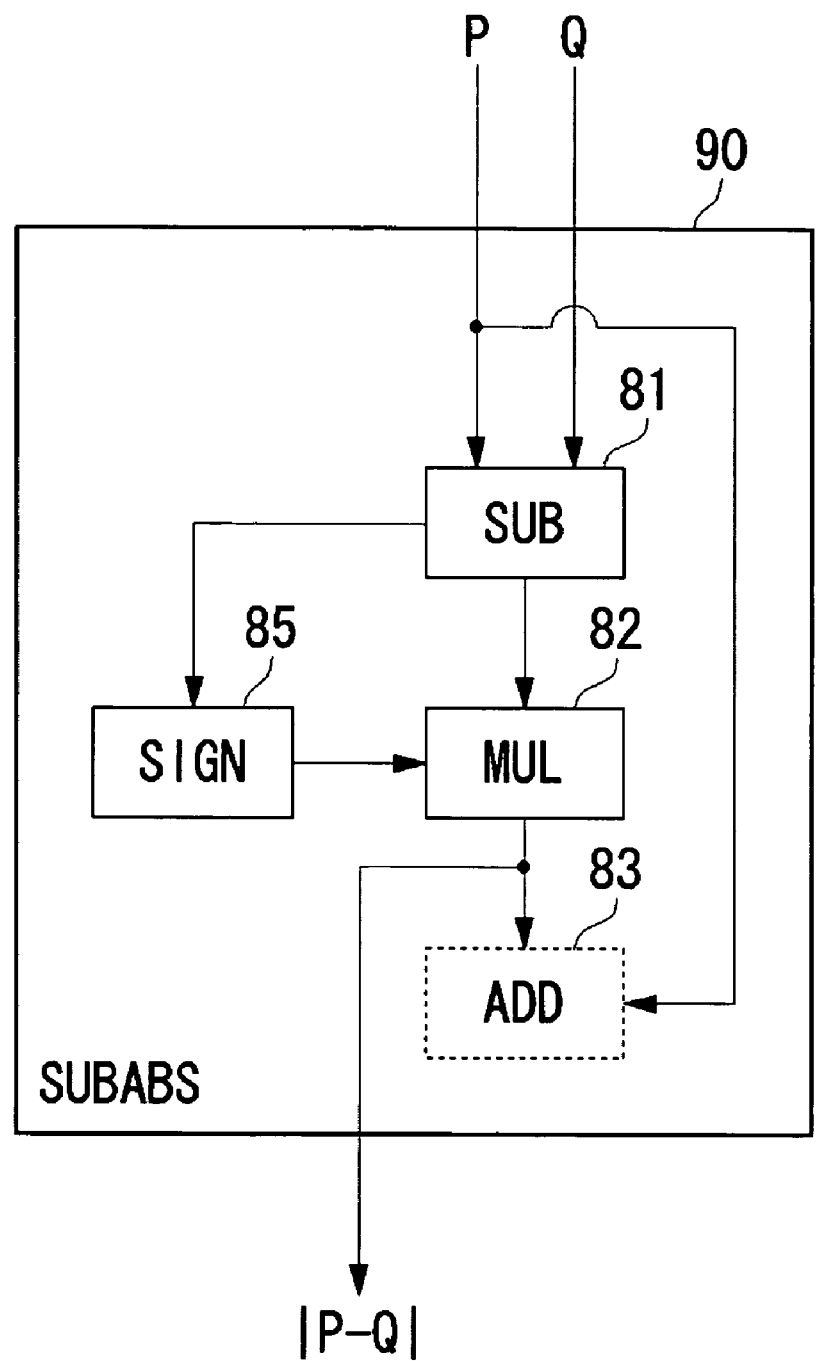
FIG. 9 shows a structure of an absolute difference unit of FIG. 8.

FIG. 9 shows a structure of the SUBABS 90. The SUBABS 90 is a diversion from the LIP 70 of FIG. 7, substantially maintaining the structure. The operation of the LIP 70 is modified so as to output an absolute difference. Like the LIP 70, the SUBABS 90 includes the subtracter 81, the multiplier 82 and the adder 83 but does not use the adder 83. Instead of the coefficient holding unit 84 for holding the interpolation coefficient $\alpha$, there is provided a positive-negative sign holding unit 85 for holding a value SIGN indicating whether the difference Q-P, the computation result of the subtracter 81, is positive or negative. The positive-negative sign holding unit 85 supplies SIGN=1 to the multiplier 82 if the difference Q-P is positive, and supplies SIGN=-1 thereto if the difference Q-P is negative.

The subtracter 81 computes the difference Q-P between the two inputs P and Q and outputs the same to the multiplier 82. The multiplier 82 is fed the input of the difference Q-P from the subtracter 81 and the input of the positive-negative sign SIGN, and multiplies the difference Q−P by the positive-negative sign SIGN. If the difference Q−P is positive, the difference Q−P is multiplied by +1. If the difference is negative, the difference Q−P is multiplied by −1. Therefore, the result of computation by the multiplier 82 is an absolute value |P−Q| of the difference between P and Q. The computation result |P−Q| of the multiplier 82 is the output of the SUBABS 90.

Figure 10:
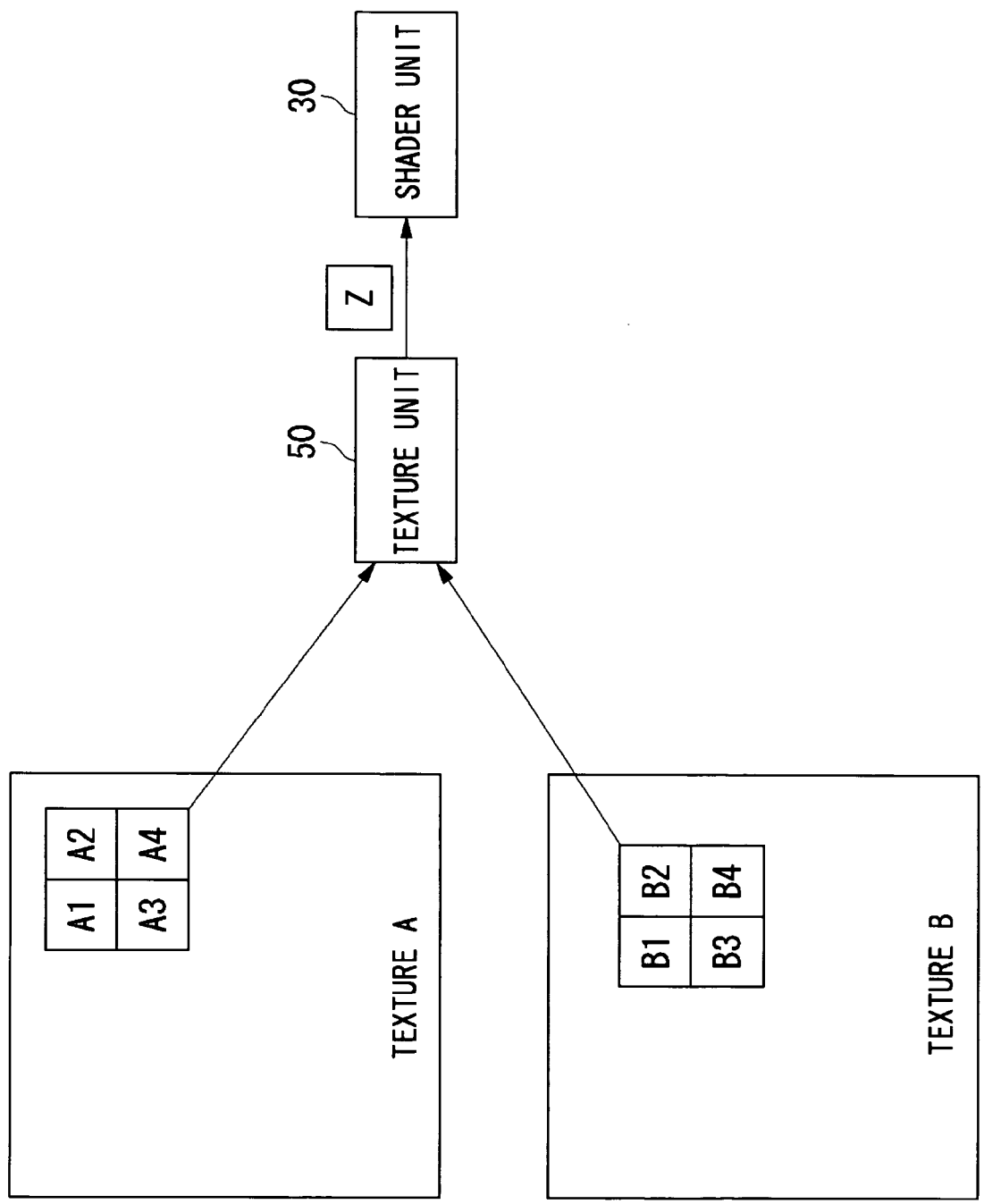
FIG. 10 shows how results of computation for sum of absolute differences by the texture unit are supplied to a shader unit.

FIG. 10 shows how the results of 2*2SAD computation by the texture unit 50 is supplied to the shader unit 30. The texture unit 50 is fed the inputs of the four texels A1-A4 of the texture A and the four texels B1-B4 of the texture B, computes the sum of absolute differences $Z=\Sigma_{i=1}^{4}|Ai-Bi|/4$, and outputs the same to the shader unit 30.

If the shader unit 30 is to compute the sum of absolute differences, it is necessary to receive from the texture unit 50 the entirety of data for the four texels A1-A4 of the texture A and the four texels B1-B4 of the texture B. In this case, the bus occupancy ratio occurring between the shader unit 30 and the texture unit 50 due to data transfer is relatively high. In this embodiment, however, the texture unit 50 computes the sum of absolute differences Z and the shader unit 30 is only fed the sum of absolute differences Z. Accordingly, the amount of data transfer from the texture unit 50 to the shader unit 30 is prevented from increasing.

By computing the sum of absolute differences in the texture unit 50, the volume of computation in the shader unit 30 is reduced so that the capability of the shader unit 30 can be assigned to more complex computation processes. The resultant distributed processing in which the texture unit 50 is responsible for relatively simple computation and the shader unit 30 is responsible for relatively advanced computation enables improvement in the overall processing efficiency.

Computation of the difference as described above is conducted between the corresponding texels of the two textures A and B. Alternatively, computation of the difference may be conducted between different texels of a given texture. For example, the sum of absolute differences may be computed between the four texels A1-A4 in the texture A and the four other texels A1'-A4' in the texture A.

Figure 11:
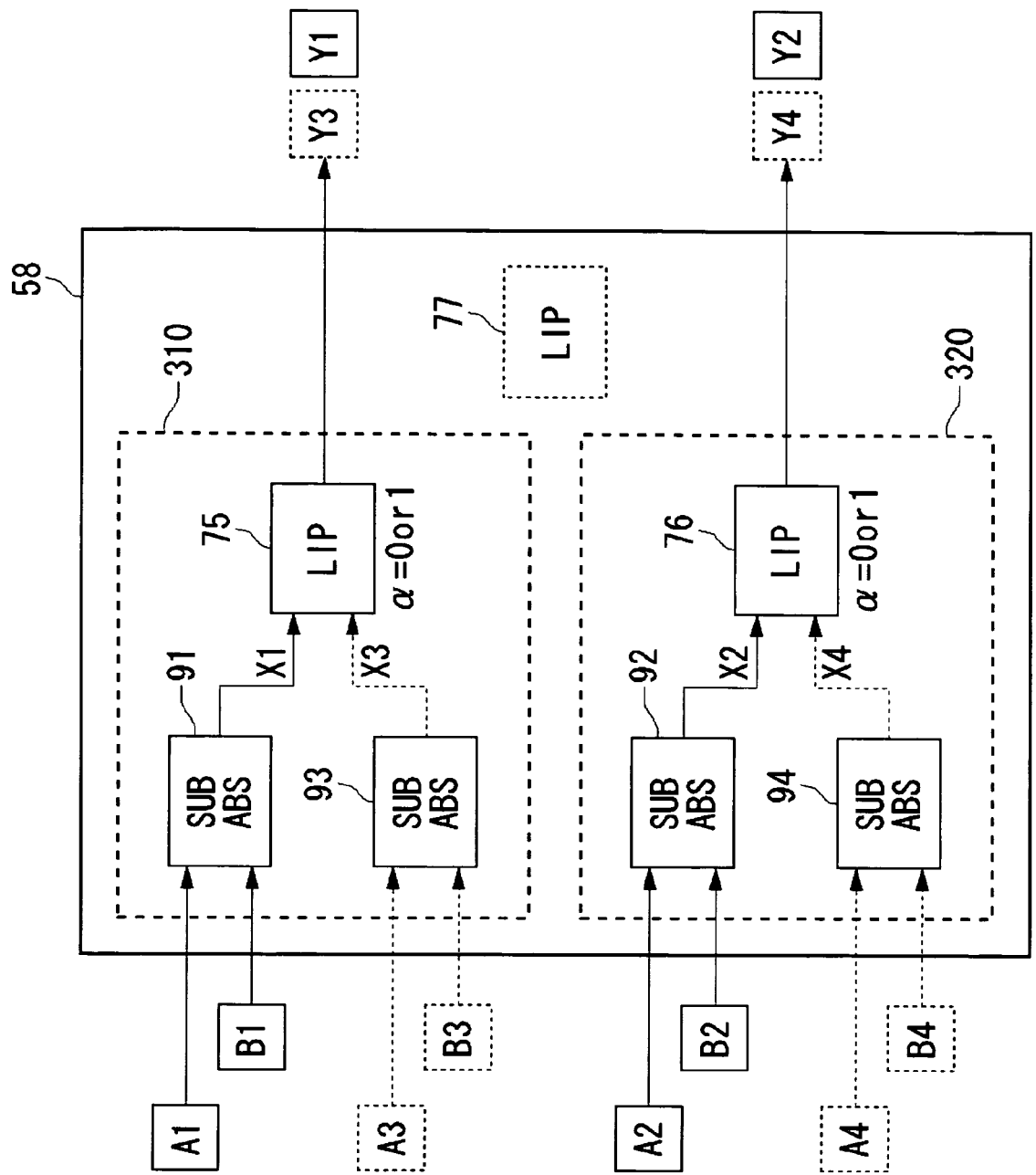
FIG. 11 shows a structure of the computation unit of FIG. 4 for computing a sum of absolute differences.

FIG. 11 shows a structure of the computation unit 58 for computing the sum of absolute differences. The computation unit 58 of FIG. 11 has the same structure as the computation 58 of FIG. 8. A difference is that the third-stage LIP 77 is not used and the LIP 75 and the LIP 76 of the second stage directly output the computation results.

The first-stage SUBABS 91 in the upper-row computation block 310 computes and outputs the absolute difference |A1−B1| of the mutually corresponding texels A1 and B1 of the two textures A and B, respectively. The SUBABS 93 computes and outputs the absolute difference |A3−B3| of the mutually corresponding texels A3 and B3 of the two textures A and B, respectively.

The second-stage LIP 75 is fed the computation result |A1−B1| of the first-stage SUBABS 91 as a first input X1, the computation result |A3−B3| of the first-stage SUBABS 93 as a second input X3, and subjects the inputs to linear interpolation, using the interpolation coefficient α=0 or 1. When the interpolation coefficient α=0 in the linear interpolation formula (1−α)X1+αX3, the first input X1 is output unmodified. When the interpolation coefficient α=1, the second input X3 is output unmodified. Therefore, the second-stage LIP 75 operates as a switch for switchably outputting one of the computation results of the SUBABS 91 and the SUBABS 93 of the first stage. Thus, the second-stage LIP 75 outputs Y1=X1=|A1−B1| as indicated by the solid line when the interpolation coefficient α=0, and outputs Y3=X3=|A3−B3| as indicated by the broken line when the interpolation coefficient α=1.

Similarly, the first-stage SUBABS 92 of the lower-row computation block 320 computes and outputs the absolute difference |A2−B2| of the mutually corresponding texels A2 and B2 of the two textures A and B. The first-stage SUBABS 94 computes and outputs the absolute difference |A4−B4| of the mutually corresponding texels A4 and B4 of the two textures A and B.

The second-stage LIP 76 is fed the computation result |A2−B2| of the first-stage SUBABS 92 as the first input X2, the computation result |A4−B4| of the SUBABS 94 as the second input X4, and subjects the inputs to linear interpolation, using the interpolation coefficient α=0 or 1. The LIP 76 outputs Y2=X2=|A2−B2| as indicated by the solid line when the interpolation coefficient α=0, and outputs Y4=X4=|A4−B4| as indicated by the broke line when the interpolation coefficient α=1.

The upper-row computation block 310 and the lower-row computation block 320 compute in parallel to output the computation results Y1-Y4. The ultimate outputs Y1-Y4 of the computation unit 58 are absolute differences (AD) of the mutually corresponding pairs (A1, B1)−(A4, B4) of the two textures A and B. Computation by the computation unit 58 for obtaining the absolute difference will be referred to as 1*1AD.

The LIP 75 in the second stage is configured to switchably use the interpolation coefficient α of 0 and 1 and to output the absolute differences Y1 and Y3 alternately. Similarly, the LIP 76 is configured to output Y2 and Y4 alternately. The four absolute differences Y1−Y4 may be output concurrently by allowing the SUBABS 91-94 to directly output the computation results X1−X4, respectively.

In the 1*1AD computation, unlike the 2*2SAD computation of FIG. 8, the differences between mutually corresponding texels of the two textures A and B are determined and output. Since the computation results of the upper-row computation block 310 and the lower-row computation block 320 operating in parallel are directly output in parallel, parallel processing is more efficient than the 2*2SAD computation results.

Figure 12:
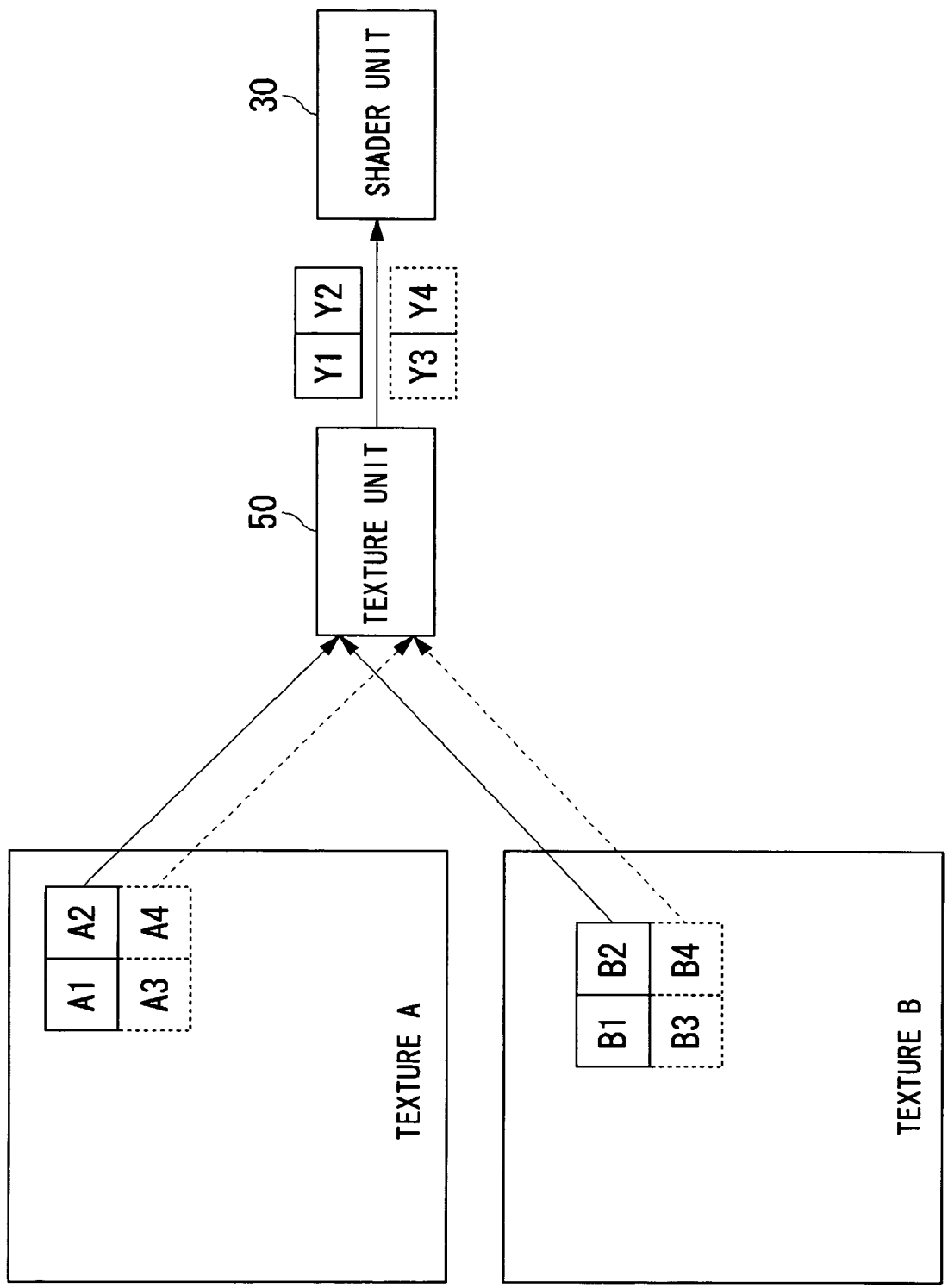
FIG. 12 shows how results of computation for absolute differences by the texture unit are supplied to the shader unit.

FIG. 12 shows how the results of 1*1AD computation by the texture unit 50 are supplied to the shader unit 30. The texture unit 50 is fed the inputs of the two texels A1 and A2 of the texture A and the two texels B1 and B2 of the texture B, as indicated by the solid lines, computes the absolute differences Y1=|A1−B1| and Y2=|A2−B2|, and supplies the same to the shader unit 30. The texture unit 50 is further fed the inputs of the two texels A3 and A4 of the texture A and the two texels B3 and B4 of the texture B, as indicated by the broken lines, computes the absolute differences Y3=|A3−B3| and Y4=|A4−B4|, and supplies the same to the shader unit 30.

If the shader unit 30 is to apply the 1*1AD computation to the mutually corresponding texel pairs of the textures A and B, it is necessary to receive from the texture unit 50 the entirety of data for the four texels A1-A4 of the texture A and the four texels B1-B4 of the texture B. In contrast, by performing the 1*1AD computation in the texture unit 50, the shader unit 30 need only receive the computation results Y1-Y4. Accordingly, the amount of data transfer from the texture unit 50 to the shader unit 30 is reduced to half.

Figure 13:
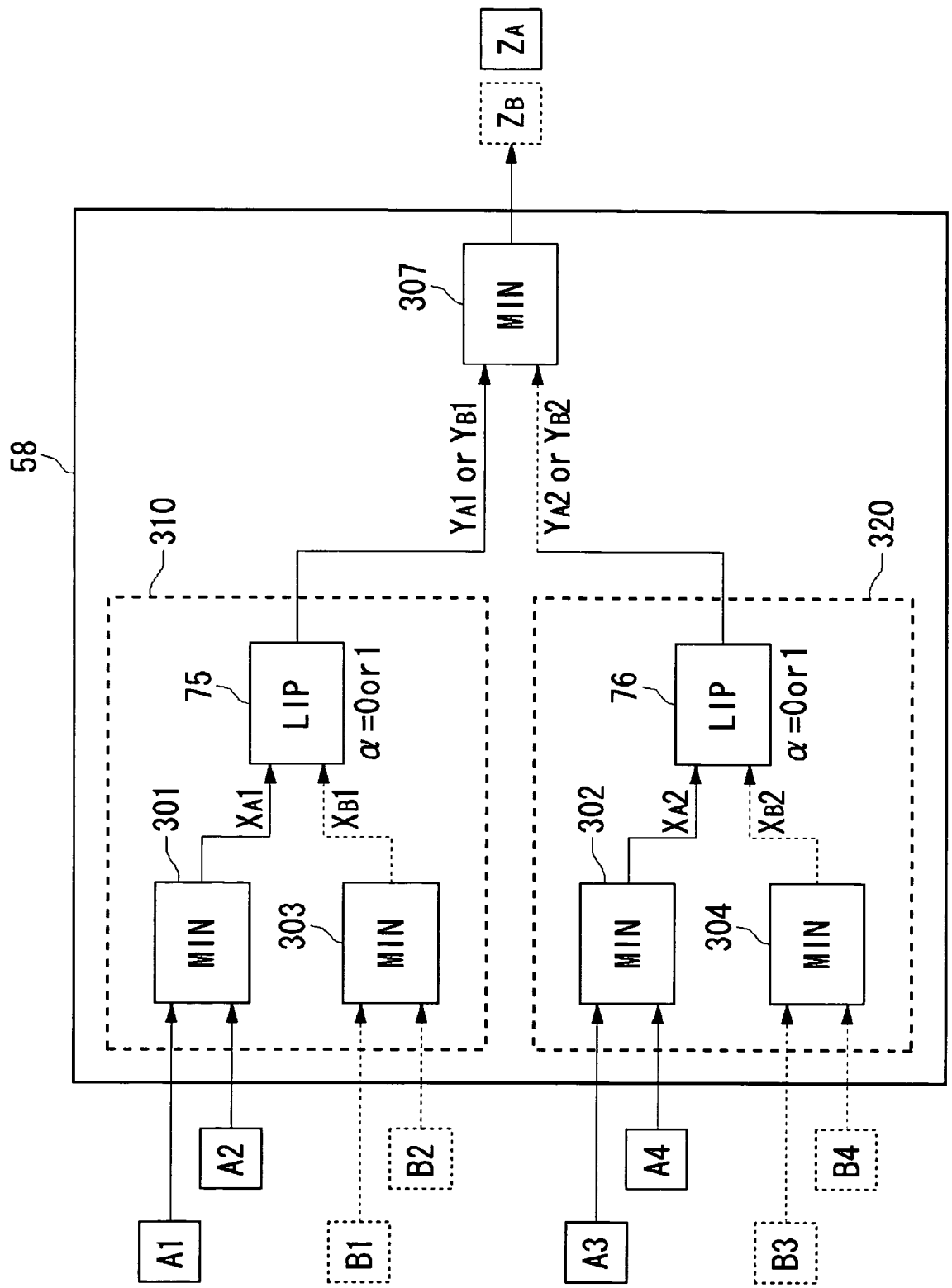
FIG. 13 shows a structure of the computation unit of FIG. 4 for obtaining the minimum of four texels in a texture.

FIG. 13 shows a structure of the computation unit 58 for obtaining the minimum of the four texels in a texture. Each of minimum value computation units (hereinafter, referred to as MIN) 301-304 of the first stage (hereinafter, generically referred to as MIN 300) is a variation of the LIP 70 with a modified computation process and is capable of computes the minimum of the two inputs.

The computation unit 58 is fed the inputs of the four texels A1-A4 of the texture A and the four texels B1-B4 of the texture B. The four texels A1-A4 of the texture A and the four texels B1-B4 of the texture B are fed to the MIN 301-304 of the first stage in a way different from that of the basic structure of the computation unit 58 shown in FIG. 5.

The first-stage MIN 301 of the upper-row computation block 310 is fed the inputs of the upper-row two texels A1 and A2, selected from he four texels of the texture A, determines the smaller value of the two texels A1 and A2 and outputs a computation result min(A1, A2). The MIN 303 is fed the inputs of the upper-row two texels B1 and B2, selected from the four texels of the texture B, determines the smaller value of the two texels B1 and B2 and outputs a computation result min(B1, B2).

The second-stage LIP 75 is fed the computation result min(A1, A2) of the first-stage MIN 301 as a first input XA1 and the computation result min(B1, B2) of the first-stage MIN 303 as a second input XB1, and subjects the inputs to linear interpolation, using the interpolation coefficient $\alpha=0$ or 1. The second-stage LIP 75 operates as a switch for switchably outputting one of the computation results of the MIN 301 and the MIN 303 of the first stage. The LIP 75 outputs YA1=XA1=min(A1, A2) as indicated by the solid line when the interpolation coefficient $\alpha=0$, and outputs YB1=XB1=min(B1, B2) as indicated by the broken line when the interpolation coefficient $\alpha=1$.

Similarly, the first-stage MIN 302 in the lower-row computation block 320 determines the smaller value of the lower-row two texels A3 and A4 of the texture A, and outputs a computation result min(A3, A4). The first-stage MIN 303 determines the minimum of the lower-row two texels B3 and B4 of the texture B, and outputs a computation result min(B3, B4).

The second-stage LIP 76 is fed the computation result min(A3, A4) of the first-stage MIN 302 as a first input XA2 and the computation result min(B3, B4) of the first-stage MIN 304 as a second input XB2, and subjects the inputs to linear interpolation, using the interpolation coefficient $\alpha=0$ or 1. The LIP 76 outputs YA2=XA2=min(A3, A4) as indicated by the solid line when the interpolation coefficient $\alpha=0$, and outputs YB2=XB2=min(B3, B4) as indicated by the broken line when the interpolation coefficient $\alpha=1$.

When the interpolation coefficient $\alpha=0$ in the LIP 75 and the LIP 76 of the second-stage, a third-stage MIN 307 is fed the inputs of the computation results YA1 and YA2 of the LIP 75 and the LIP 76 of the second stage, respectively, determines the minimum of the two inputs, and outputs a computation result ZA=min(YA1, YA2). Since YA1=min(A1, A2) and YA2=min(A3, A4), the computation result ZA=min(A1, A2, A3, A4). Therefore, the computation in the MIN 307 is for determining the minimum of the four texels A1-A4 of the texture A.

When the interpolation coefficient $\alpha=1$ in the LIP 75 and the LIP 76 of the second stage, the third-stage MIN 307 is fed the inputs of the computation results YB1 and YB2 of the LIP 75 and the LIP 76 of the second stage, respectively, determines the minimum of the two inputs, and outputs a computation result ZB=min(YB1, YB2). Since YB1=min(B1, B2) and YB2=min(B3, B4), the computation result ZB=min(B1, B2, B3, B4). Therefore, the computation in the MIN 307 is for determining the minimum of the four texels B1-B4 of the texture B.

Thus, the computation unit 58 computes and outputs the minimum ZA of the four texels A1-A4 of the texture A and the minimum ZB of the four texels B1-B4 of the texture B, by switchably referring to the two textures A and B. When a texels comprises a plurality of components such as an RGB color value and transparency, minimum values of respective components are output. The computation by the computation unit 58 for determining the minimum of the four texels will be referred to as 2*2MIN.

Figure 14:
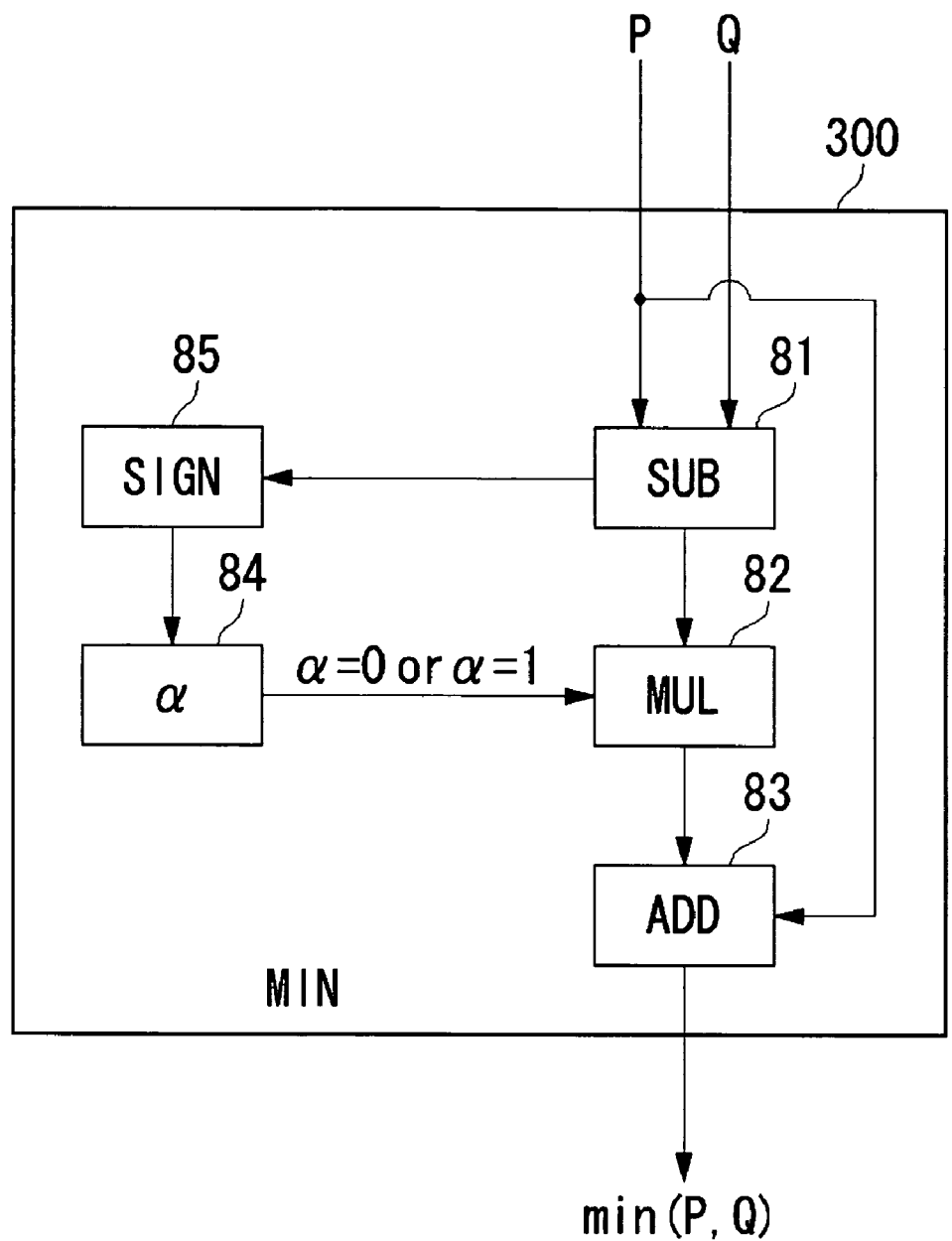
FIG. 14 shows a structure of a minimum value computing unit of FIG. 13.

FIG. 14 shows a structure of the MIN 300. The MIN 300 is a diversion from the LIP 70 of FIG. 7. The operation of the LIP 70 is modified so as to output a minimum value. Like the LIP 70, the MIN 300 includes the subtracter 80, the multiplier 82 and the adder 83. A positive-negative sign holding unit 85 holds a value SIGN indicating a positive-negative sign of the difference Q−P, the computation result of the subtracter 81, and supplies SIGN=1 to the coefficient holding unit 84 if the difference Q−P is positive, and supplies SIGN=−1 thereto if the difference Q−P is negative. The coefficient holding unit 84 sets the interpolation coefficient $\alpha$ to 0 when supplied with SIGN=1 form the positive-negative sign holding unit 85, and sets the interpolation coefficient $\alpha$ to 1 when supplied with SIGN=−1 from the positive-negative sign holding unit 85. The coefficient holding unit 84 supplies the interpolation coefficient $\alpha$ to the multiplier 82.

The subtracter 81 computes the difference Q−P between the two inputs P and Q and outputs the same to the multiplier 82. The multiplier 82 is fed the input of the difference Q−P from the subtracter 81 and the input of the interpolation coefficient $\alpha$ from the coefficient holding unit 84, and multiplies the difference Q−P by the interpolation coefficient $\alpha$. If the difference Q−P is positive, the multiplier 82 multiplies the difference Q−P by 0 so that the computation result is 0. If the difference Q−P is negative, the multiplier 82 multiplies the difference Q−P by 1 so that the computation result is Q−P. The multiplier 82 supplies the computation result to the adder 83.

The adder 83 adds the input P to the computation result of the multiplier 82. If the difference Q−P is positive, the adder 83 adds the input P to the output 0 from the multiplier 82 so that the computation result is P. If the difference Q−P is negative, the adder 83 adds the input P to the output Q−P from the multiplier 82 so that the computation result is Q. Accordingly, the adder 83 outputs the smaller value of the inputs P and Q so that the ultimate output of the MIN 300 is min(P, Q). The positive-negative sign holding unit 85 may be configured to output SIGN=1 or −1 when the two inputs P and Q are equal to each other.

Figure 15:
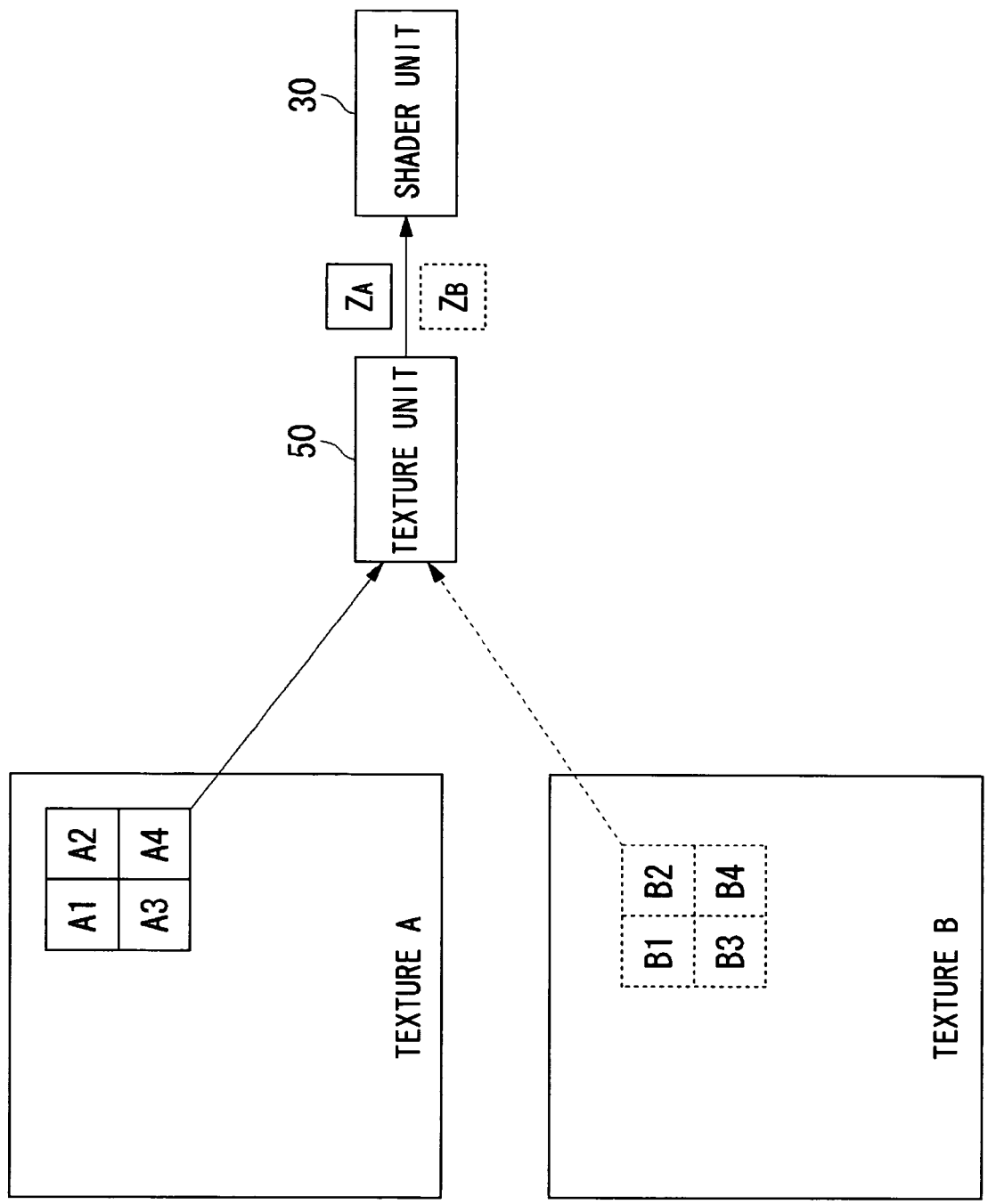
FIG. 15 illustrates how results of computation for a minimum value by the texture unit are supplied to the shader unit.

FIG. 15 illustrates how the 2*2MIN computation by the texture unit 50 is supplied to the shader unit 30. The texture unit 50 is fed the four texels A1-A4 of the texture A, and supplies the minimum value ZA of the four texels to the shader unit 30. Further, the texture unit 50 is fed the inputs of the four texels B1-B4 of the texture B, and supplies the minimum value ZB of the four texels to the shader unit 30.

Since the shader unit 30 is only fed the inputs of the minimum values ZA and ZB determined by the texture unit 50, the amount of data transfer from the texture unit 50 to the shader unit 30 is reduced to ¼.

Figure 16:
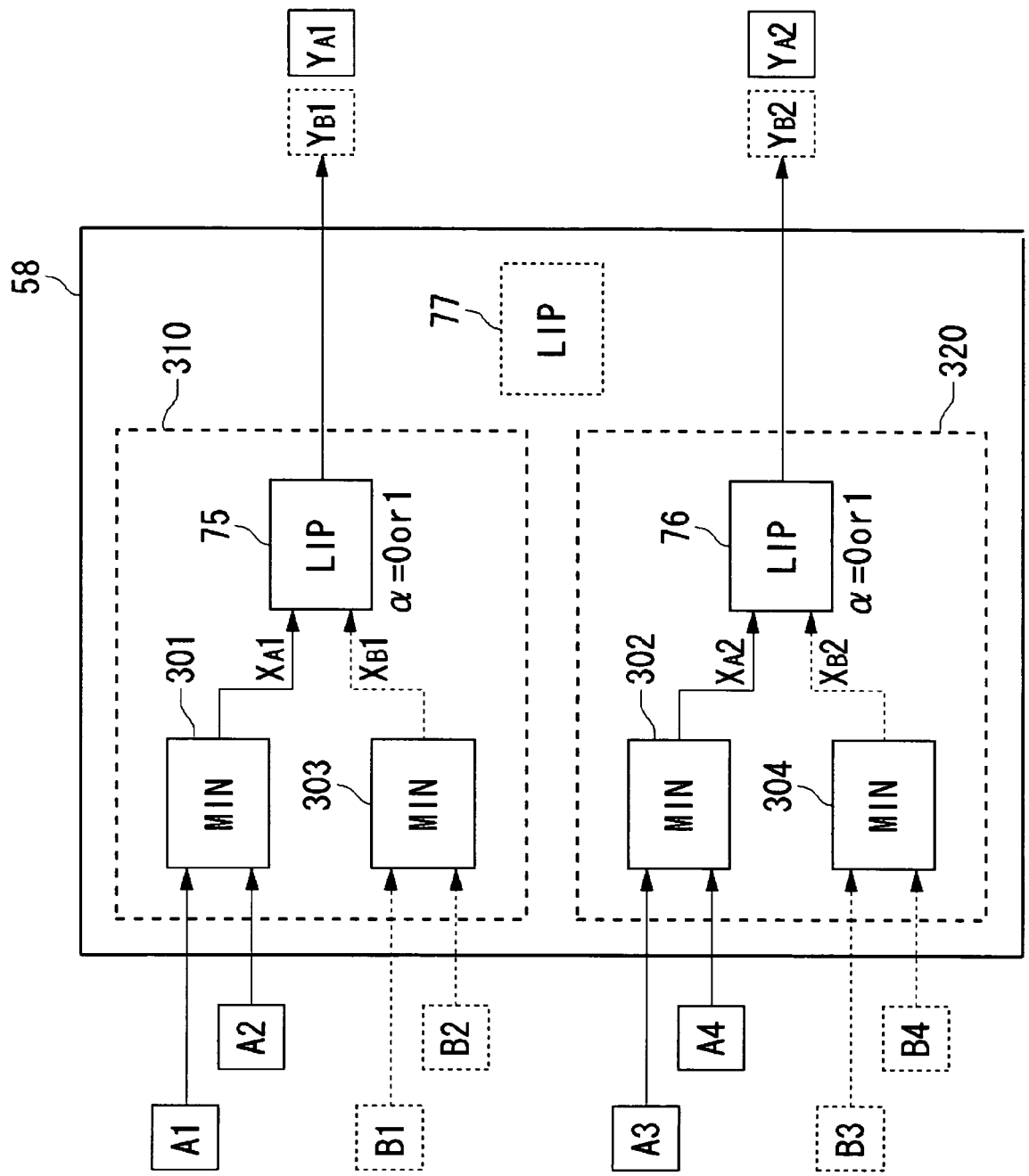
FIG. 16 shows a structure of the computation unit of FIG. 4 for determining the minimum value of two texels in a texture.

FIG. 16 shows a structure of the computation unit 58 for determining the minimum of two texels of a texture. In a similar configuration as the structure of FIG. 13, the MIN's 301-304 of the first stage of the computation unit 58 are fed the texels A1-A4 of the texture A and the texels B1-B4 of the texture B. A difference is that the LIP's 75 and 76 of the second stage directly output the computation results.

The second-stage LIP 75 of the upper-row computation block 310 operates as a switch for switchably outputting one of the computation results of the MIN 301 and the MIN 303 of the first stage. When the interpolation coefficient α=0, the LIP 75 outputs the minimum value YA1=min(A1, A2) of the upper-row two texels A1 and A2, selected from the four texels of the texture A. When the interpolation coefficient α=1, the LIP 75 outputs the minimum value YB1=min(B1, B2) of the upper-row two texels B1 and B2, selected from the upper-row four texels of the texture B. The output of the second-stage LIP 75 is the output of the computation unit 58.

Similarly, the second-stage LIP 76 of the lower-row computation block 320 operates as a switch for switchably outputting one of the computation results of the MIN 302 and the MIN 304 of the first stage. When the interpolation coefficient α=0, the LIP 76 outputs the minimum value YA2=min(A3, A4) of the lower-row two texels A3 and A4, selected from the four texels of the texture A. When the interpolation coefficient α=1, the LIP 76 outputs the minimum value YB2=min(B3, B4) of the lower-row two texels B3 and B4, selected from the lower-row four texels of the texture B. The output of the LIP 76 is the output of the computation unit 58.

Thus, the upper-row computation block 310 outputs the minimum value YA1 of the two texels A1 and A2 of the texture A, and the minimum value YB1 of the two texels B1 and B2 of the texture B. The lower-row computation block 320 outputs the minimum value YA2 of the other two texels A3 and A4 of the texture A, and the minimum value YB2 of the other two texels B3 and B4 of the texture B. The computation by the computation unit 58 for determining the minimum of two texels of a texture will be referred to as 2*1MIN.

Figure 17:
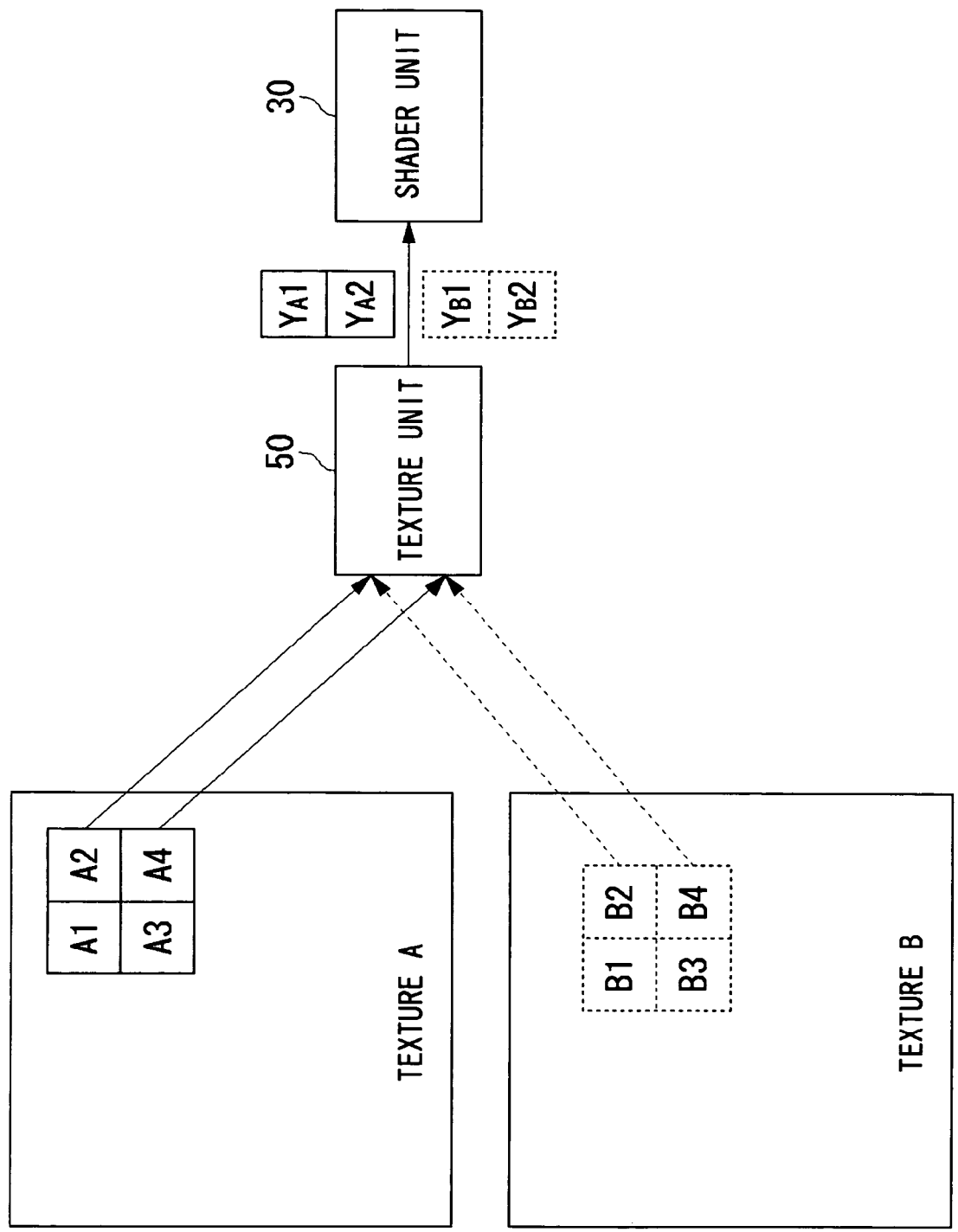
FIG. 17 illustrates how results of computation for a minimum value by the texture unit are supplied to the shader unit 30.

FIG. 17 illustrates how the results of 2*1MIN computation by the texture unit 50 are supplied to the shader unit 30. The texture unit 50 is fed the inputs of the four texels A1-A4 of the texture A, and supplies the minimum value YA1 of the upper-row two texels A1 and A2 and the minimum value YA2 of the lower-row two texels A3 and A4 to the shader unit 30. The texture unit 50 is also fed the inputs of the four texels B1-B4 of the texture B, and supplies the minimum value YB1 of the upper-row two texels B1 and B2 and the minimum value YB2 of the lower-row two texels B3 and B4 to the shader unit 30.

Since the shader unit 30 is only fed the inputs of the minimum value of the upper row of the four texels and the minimum value of the lower row thereof, the amount of data transfer from the texture unit 50 to the shader unit 30 is reduced to half.

Referring to FIGS. 13 and 16, by using a maximum value detector (MAX) for determining the larger value of the two inputs P and Q, instead of a minimum value detector (MIN) for determining the smaller value of the two inputs P and Q, 2*2MAX and 2*1MAX computations are possible. The maximum value detector can be implemented by modifying the MIN 300 of FIG. 14 such that the interpolation coefficient α=1 when the difference Q−P is positive and the interpolation coefficient α=0 when the difference Q−P is negative.

In the SAD, AD, MIN and MAX computations by the computation unit 58 described above, a total of eight texels values are acquired from the two textures A and B and fed to the first stage of the computation unit 58. Alternatively, eight texel values may be acquired from a texture and fed to the first stage of the computation unit 58. Referring to FIG. 13, by replacing the LIP 75 and the LIP 76 of the second stage by the MIN 305 and the MIN 306, minimum value detectors, it is possible to compute a 2*4MIN. In this case, the texels A1 and A2, selected from the eight texels A1-A8 of the texture A, are fed to the MIN 301 of the upper-row computation block 310, and the texels A3 and A4 are fed to the MIN 303 so that the minimum value of the four texels A1-A4 is determined. In the lower-row computation block 320, the texels A5 and A6, selected from the eight texels A1-A8 of the texture A, are fed to the MIN 302, and the texels A7 and A8 are fed to the MIN 304 so that the minimum value of the four texels A5-A8 is determined. Finally, the third-stage MIN 307 determines the minimum value of the eight texels A1-A8 of the texture A, based on the computation results of the upper-row computation block 310 and the lower-row computation block 320. Similarly, 2*4MAX may be computed for a single texture.

The SAD, AD, MIN and MAX computations by the computation unit 58 described above may be applied to various image processes. For example, by using frames of a moving image as texture data, the computation unit 58 is capable of difference computation between frame images, enabling interframe coding. A description will now be given of the MPEG coding process as an exemplary area of application of the computations enabled by the computation unit 58 to image processing.

Figure 18:
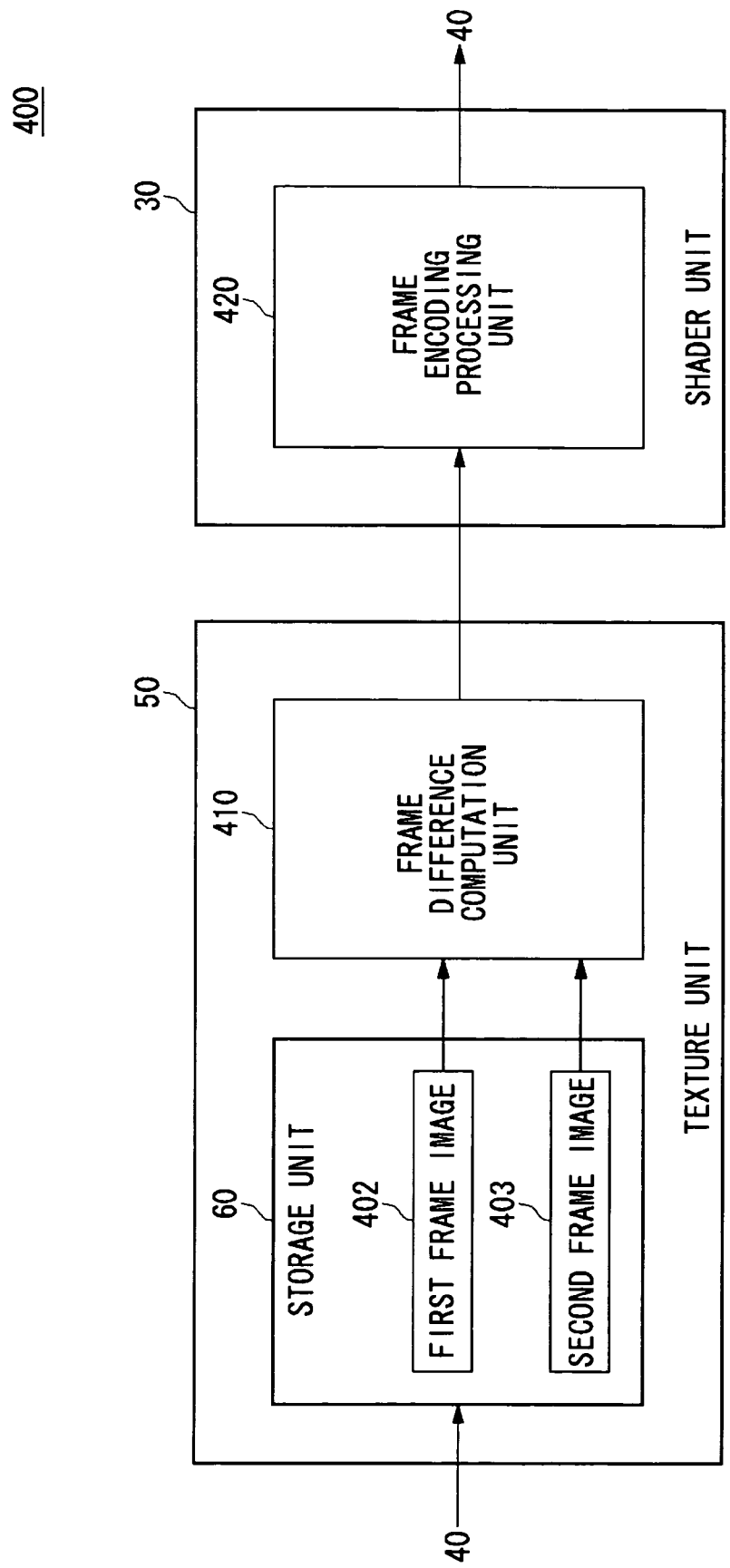
FIG. 18 shows a structure of an image encoding apparatus according to the embodiment.

FIG. 18 shows a structure of an image encoding apparatus 400 according to the embodiment. A texture unit 50 computes a difference between frames of a moving image and supplies a computation result to the shader unit 30. The shader unit 30 performs compression encoding of the moving image frame, based on the difference computation result.

An image frame picked up by a camera or the like is buffered in the memory 40. The texture unit 50 reads image frames in succession from the memory 40. A storage unit 60 of the texture unit 50 temporarily stores a first frame image 402 and a second frame image 403. These are two consecutive frame images and correspond to the first texture data 62 and the second texture data 63 of FIG. 4.

A frame difference computation unit 410 corresponds to the computation unit 58 of FIG. 4, and determines a difference between the first frame image 402 and the second frame image 403. In MPEG-4, a technology known as motion compensation is used. Motion compensation determines a motion vector indicating the direction and magnitude of movement occurring between macroblocks in consecutive image frames. Interframe compression encoding is performed using the motion vector information. A macroblock is composed of four blocks each containing 8*8 pixels. The overall size of a macroblock is 16*16 pixels.

For motion compensation, the frame difference computation unit 410 utilizes the 2*2SAD computation. For a given macroblock (hereinafter, referred to as a target macroblock) in the first frame image 402, the frame difference computation unit 410 selects, in the second frame image 403, several macroblocks that are candidates for correspondence (hereinafter, referred to as prediction macroblocks) in the neighborhood of the target macroblock.

The frame difference computation unit 410 applies the 2*2SAD computation to the target macroblock and the candidates for prediction macroblock so as to determine sums of absolute differences between two macroblocks of possible correspondence. The frame difference computation unit 410 determines the sums of absolute differences with respect to the target macroblock, for all candidates for prediction macroblocks. The candidate for prediction macroblock providing the smallest sum of absolute differences is identified as the prediction macroblock. In this way, the prediction macroblock providing the smallest error with respect to the target macroblock in the first frame image 402 is identified, with the result that a motion vector indicating the movement from the target macroblock to the prediction macroblock is determined.

In this way, the frame difference computation unit 410 identifies the prediction macroblocks in the second frame image 403 for the respective target macroblocks in the first frame image 402, and determines a motion vector for each of the macroblocks.

The frame difference computation unit 410 supplies information on motion vector for the macroblocks and image difference data to the shader unit 30, in addition to the frame image that serves as a reference for motion compensation.

A frame encoding processing unit 420 of the shader unit 30 performs interframe compression encoding, using the frame image that serves as a reference for motion compensation, the motion vector information and the difference data, so as to generate encoded image data and store the same in the memory 40.

When the computation of difference between the first frame image 402 and the second frame image 403 is completed, the texture unit 50 similarly computes an interframe difference between the subsequent pair of frame images so as to determine an associated motion vector and supply the difference and the vector to the shader unit 30. The shader unit 30 continues to generate encoded image data by interframe compression encoding.

According to the image encoding apparatus 400 of the embodiment, the texture unit 50 performs a relatively simple task of computing an interframe difference, using an interpolation unit, computes a motion vector, and supplies the difference and the vector to the shader unit 30. The shader unit 30 performs a series of steps to encode moving image frames, including 1) transform into the spatial frequency domain, such as discrete cosine transform or discrete wavelet transform, 2) quantization and 3) variable length encoding. By distributing steps for the encoding process such that the texture unit 50 is tasked to perform relatively simple difference computation and the shader unit 30 is tasked to perform relatively complex encoding computation, the processing efficiency is improved compared with a case where the shader unit 30 alone is tasked to perform the entire computation related to the encoding process.

Since the texture unit 50 has a high texture computation capability, it is possible to perform difference computation maintaining a high resolution. More specifically, frame images need not be reduced and the resolution need not be dropped. Burdens may be shared such that the texture unit 50 computes differences between image frames with a high precision and supplies the shader unit 30 with the computation results only, and the shader unit 30 is fed the computation results from the texture unit 50 and is tasked to perform relatively complex image processing. With this, both the precision and processing efficiency are improved.

In the above description, the image encoding apparatus 400 is assumed to perform interframe encoding. The image encoding apparatus 400 likewise may perform intraframe encoding. In this case, the frame difference computation unit 410 of the texture unit 50 determines a difference between different blocks in a frame image, and supplies a result to the shader unit 30. The frame encoding processing unit 420 of the shader unit 30 performs intraframe compression encoding based on the difference between the different blocks in the frame image.

In the description given above, the image encoding apparatus 400 is assumed to apply compression encoding to a moving image picked up by a camera or the like. Alternatively, the image encoding apparatus 400 may apply three-dimensional computer graphics generated by the shader unit 30 to compression encoding. The moving image of three-dimensional computer graphics generated by the shader unit 30 may be stored in the memory 40. The texture unit 50 may compute a difference between frames of the moving image stored in the memory 40. The shader unit 30 may perform interframe encoding. With this, the MPEG encoding of the moving image of three-dimensional computer graphics is performed.

Described above is an explanation of the present invention based on the embodiment. The description of the embodiment is illustrative in nature and various variations in constituting elements and processes involved are possible. Those skilled in the art would readily appreciate that the variations are also within the scope of the present invention.

In the description given above, the texture unit 50 is assumed to apply computation to two sets of texture data. Alternatively, computation may be applied to three or more sets of texture data. Information such as parameters related to four sets of texture data may be set in the configuration register group 52. The information set in the configuration register group 52 for two sets of texture data, selected from the four sets, may be referred to in order to computes a difference. Subsequently, the information set in the configuration register group 52 for the other two sets of texture data may be referred to in order to compute a difference between the other two sets of texture data. With this, a succession of four sets of texture data may be subject to computation without switching of the information set in the configuration register group 52.

In the description given above, compression encoding of a moving image is given as an example of various computing functions, enabled by diversion of the structure of interpolation unit in the texture unit 50, as applied to image processing. Other applications are also possible. For example, the texture unit 50 may read two still images as texture data and conduct pattern matching of the two still images using various computing functions. Alternatively, the texture unit 50 may detect edges in an image using various computation functions.

Further, texture data processed by the texture unit 50 may not have to be image data. For example, arbitrary information related to an image such as Z values, indicating the depth of image, may be processed. Interpolation units may be diverted to various computations on the information related to the image.

What is claimed is:

1. An image processing apparatus, comprising:
  a storage unit which holds first and second texture data; and
  a computation unit which identifies areas of correspondence between the first texture and the second texture, and applies a predetermined computation process to a texel inside the area of correspondence in the first texture and a texel inside the area of correspondence in the second texture;
  wherein the predetermined computation process is a computation related to a difference between a value related to a texel in the first texture and a value related to a texel in the second texture, the texel in the first texture and the texel in the second texture corresponding to each other in the areas of correspondence; and
  wherein said computation unit comprises an interpolation unit which applies linear interpolation to values related to texels in at least one texture, the interpolation unit including a subtracter, a multiplier and an adder, and
  wherein said interpolation unit is diverted in such a manner that at least the subtracter in said interpolation unit is used to perform the computation related to said difference.

2. The image processing apparatus according to claim 1, further comprising:

a group of registers which concurrently hold first information set up for the first texture and second information set up for the second texture, wherein said computation unit reads the first and second texture data, in accordance with the first and second information, respectively, held in said group of registers, and applies the predetermined computation process to the data.

3. An image processing apparatus, comprising:

a storage unit which holds first and second texture data; and a computation unit which identifies areas of correspondence between the first texture and the second texture, and applies a predetermined computation process to a texel inside the area of correspondence in the first texture and a texel inside the area of correspondence in the second texture, and wherein said computation unit comprises:

two interpolation units in a preceding stage, each interpolation unit applying linear interpolation to values related to texels in at least one texture, each of the two interpolation unit including a subtracter, a multiplier and an adder;

an interpolation unit in a subsequent stage which applies linear interpolation to outputs from the two interpolation units in the preceding stage, wherein each of the two interpolation units in the preceding stage is diverted in such a manner that at least the subtracter in each of the two interpolation units in the preceding stage is used to compute an absolute difference between a value related to a texel in the first texture and a value related to a texel in the second texture, the texel in the first texture and the texel in the second texture corresponding to each other in the areas of correspondence, and the interpolation unit in the subsequent stage determines a sum of the absolute differences produced by the two interpolation units in the preceding stage.

4. An image processing apparatus, comprising:

a storage unit which holds first and second texture data; and a computation unit which switchably refers to the first texture and the second texture held in said storage unit, and alternately applies a predetermined computation process to a texel in the first texture and a texel in the second texture, and wherein the predetermined computation process is a comparison in magnitude between a value related to a texel in a predetermined area in the first texture and a value related to a texel in a predetermined area in the second texture, and wherein said computation unit comprises an interpolation unit which applies linear interpolation to values related to texels in at least one texture, the interpolation unit including a subtracter, a multiplier and an adder, and wherein said interpolation unit is diverted in such a manner that at least the subtracter in said interpolation unit is used to perform said comparison.

5. The image processing apparatus according to claim 4, further comprising a group of registers which concurrently hold first information set up for the first texture and second information set up for the second texture, wherein said computation unit reads the first and second texture data, in accordance with the first and second information, respectively, held in said group of registers, and applies the predetermined computation process to the data.

6. An image processing apparatus, comprising:

a storage unit which holds first and second texture data; and a computation unit which switchably refers to the first texture and the second texture held in said storage unit, and alternately applies a predetermined computation process to a texel in the first texture and a texel in the second texture, and wherein said computation unit comprises:

two interpolation units in a preceding stage, each interpolation unit applying linear interpolation to values related to texels in at least one texture, each of the two interpolation units including a subtracter, a multiplier and an adder; and an interpolation unit in a subsequent stage which applies linear interpolation to outputs from the two interpolation units in the preceding stage, wherein each of the two interpolation units in the preceding stage is diverted in such a manner that at least the subtracter in each of the two interpolation units in the preceding stage is used to compute a minimum value or a maximum value related to a texel in a predetermined area in the first texture or related to a texel in a predetermined area in the second texture, and wherein the interpolation unit in the subsequent stage determines a minimum value or a maximum value of outputs produced by the two interpolation units in the preceding stage.

7. An image processing apparatus comprising:

a texture unit which applies a computation process to texture data; and a shading unit connected to said texture unit via a bus, which generates rendering data, based on the texture data subjected to the computation process by said texture unit, wherein said texture unit reads frame images of a moving image as the texture data, computes a difference related to frame images, and outputs results of difference computation to said shading unit, and said shading unit applies compression encoding to the moving image using the results of difference computation related to the frame images received from said texture unit.

8. The image processing apparatus according to claim 7, wherein said texture unit reads two frame images as the texture data, computes a difference between the two frame images, and outputs results of difference computation to the shading unit, and said shading unit applies compression encoding to the moving image using the difference between the two frame images received from said texture unit.

9. An image processing method, comprising:

reading out data for first and second textures from a memory;

identifying areas of correspondence between the first texture and the second texture; and applying a predetermined computation process to a texel inside the area of correspondence in the first texture and a texel inside the area of correspondence in the second texture;

wherein the predetermined computation process is a computation related to a difference between a value related to a texel in the first texture and a value related to a texel in the second texture, the texel in the first texture and the texel in the second texture corresponding to each other in the areas of correspondence, wherein an interpolation unit for applying linear interpolation to values related to texels in at least one texture is diverted to said predetermined computation process, the interpolation unit including a subtracter, a multiplier and an adder, and wherein said interpolation unit is diverted in such a manner that at least the subtracter in said interpolation unit is used to perform the computation related to said difference.

10. An image processing method, comprising:

switchably referring to a first texture and a second texture held in a memory; and alternately applying a predetermined computation process to a texel in the first texture and a texel in the second texture; and wherein the predetermined computation process is a comparison in magnitude between a value related to a texel in a predetermined area in the first texture and a value related to a texel in a predetermined area in the second texture, wherein an interpolation unit for applying linear interpolation to values related to texels in at least one texture is diverted to said predetermined computation process, the interpolation unit including a subtracter, a multiplier and an adder, and wherein said interpolation unit is diverted in such a manner that at least the subtracter in said interpolation unit is used to perform said comparison.

11. A program product comprising a computer readable medium having embodied therein a computer program, the computer program causing a computer to execute the steps of:

reading data for a first texture and a second texture from a memory; performing a computation related to a difference between corresponding areas in the first texture and the second texture; and performing the computation related to said difference by diverting an interpolation unit for applying linear interpolation to values related to texels in at least one texture, the interpolation unit including a subtracter, a multiplier and an adder, in such a manner that at least the subtracter in said interpolation unit is used to perform the computation related to said difference.

12. A program product comprising a computer readable medium having embodied therein a computer program, the computer program causing a computer to execute the steps of:

switchably referring to a first texture and a second texture held in a memory;

alternately performing a computation related to magnitude comparison in the first texture and the second texture; and performing said comparison by diverting an interpolation unit for applying linear interpolation to values related to texels in at least one texture, the interpolation unit including a subtracter, a multiplier and an adder, in such a manner that at least the subtracter in said interpolation unit is used to perform said comparison.

13. An image processing apparatus comprising:

a texture unit which applies a computation process to texture data; and a shading unit connected to said texture unit via a bus, which generates rendering data, based on the texture data subjected to the computation process by said texture unit, wherein said texture unit comprises:

a storage unit which holds first and second texture data; and a computation unit which identifies areas of correspondence between the first texture and the second texture, and applies a predetermined computation process to a texel inside the area of correspondence in the first texture and a texel inside the area of correspondence in the second texture, and outputs via the bus a result of the computation process to said shading unit, and wherein said computation unit comprises an interpolation unit which applies linear interpolation to values related to texels in at least one texture, the interpolation unit including a subtracter, a multiplier and an adder, and said interpolation unit is diverted in such a manner that at least the subtracter in said interpolation unit is used to perform the predetermined computation process other than the linear interpolation, and wherein said shading unit performs a rendering processing using the result of the predetermined computation process other than the linear interpolation received via the bus from the texture unit whereby the amount of data transfer from the texture unit to the shading unit is reduced when compared to a case in which the shading unit receives via the bus the texels which have not been subjected to the predetermined computation process other than the linear interpolation by said texture unit so as to be subjected to the predetermined computation process other than the linear interpolation by the shading unit.

14. An image processing apparatus comprising:

a texture unit which applies a computation process to texture data; and a shading unit connected to said texture unit via a bus, which generates rendering data, based on the texture data subjected to the computation process by said texture unit, wherein said texture unit comprises:

a storage unit which holds first and second texture data; and a computation unit which switchably refers to the first texture and the second texture held in said storage unit, and alternately applies a predetermined computation process to a texel in the first texture and a texel in the second texture, and outputs via the bus a result of the computation process to said shading unit, and wherein said computation unit comprises an interpolation unit which applies linear interpolation to values related to texels in at least one texture, the interpolation unit including a subtracter, a multiplier and an adder, and said interpolation unit is diverted in such a manner that at least the subtracter in said interpolation unit is used to perform the predetermined computation process other than the linear interpolation, and wherein said shading unit performs a rendering processing using the result of the predetermined computation process other than the linear interpolation received via the bus from the texture unit whereby the amount of data transfer from the texture unit to the shading unit is reduced when compared to a case in which the shading unit receives via the bus the texels which have not been subjected to the predetermined computation process other than the linear interpolation by said texture unit so as to be subjected to the predetermined computation process other than the linear interpolation by the shading unit.

* * * * *